United States Patent
Arikawa et al.

[11] Patent Number: 6,147,937
[45] Date of Patent: Nov. 14, 2000

[54] DISPLAY DEVICE AND ELECTRONIC TIMEPIECE

[75] Inventors: Yasuo Arikawa, Chino; Eiichi Miyazawa, Suwa; Tsuyoshi Maeda, Yamanashi-ken, all of Japan

[73] Assignee: Seiko Epson Corporation, Tokyo, Japan

[21] Appl. No.: 09/125,705

[22] PCT Filed: May 1, 1998

[86] PCT No.: PCT/JP98/02001

§ 371 Date: Aug. 24, 1998

§ 102(e) Date: Aug. 24, 1998

[87] PCT Pub. No.: WO98/50819

PCT Pub. Date: Nov. 12, 1998

[30] Foreign Application Priority Data

May 7, 1997 [JP] Japan ..................................... 9-117320
Sep. 7, 1997 [JP] Japan ..................................... 9-238635

[51] Int. Cl.$^7$ .......................... G04C 17/00; G02F 1/1333; G02F 1/1335
[52] U.S. Cl. .............................. 368/242; 349/96; 349/97; 349/113
[58] Field of Search ....................... 368/82–84, 239–242; 345/96–100, 104–108, 113–115

[56] References Cited

U.S. PATENT DOCUMENTS

| 5,341,231 | 8/1994 | Yamamoto et al. | 359/49 |
| 5,361,151 | 11/1994 | Sonehara et al. | 359/65 |
| 5,663,777 | 9/1997 | Aoyama | 349/96 |
| 5,805,252 | 9/1998 | Shimada et al. | 349/113 |

FOREIGN PATENT DOCUMENTS 6-230362  8/1994  Japan .

*Primary Examiner*—Vit Miska
*Attorney, Agent, or Firm*—Oliff & Berridge, PLC

[57] ABSTRACT

A display device including a color polarizer (11), a liquid-crystal panel (8) and a polarizing splitter (32). The color polarizer (11) transmits all wavelengths (arrows Q and S) or a specific wavelength of a light ray (arrows P and R) depending on the direction of the polarization axis of the linearly polarized light ray. The polarizing splitter (32) transmits a light ray linearly polarized in one direction (arrows Q and R) and reflects the remainder of the linearly polarized light rays. A reflective display presents two display states depending on light paths P and S, and a transmissive display presents two display states depending on light paths T and U, and in either case, a multi-color display is obtained. Since the light reflection from the polarizing splitter is used during a reflective displaying, a bright display results.

25 Claims, 14 Drawing Sheets

DISPLAY DEVICE AND ELECTRONIC TIMEPIECE

BACKGROUND OF THE INVENTION

1. Field of Invention

The present invention relates to a display device and, more particularly, to a transflective display device having a multi-color display capability. The present invention also relates to an electronic watch such as a wristwatch or stopwatch for counting and presenting time. More particularly, the present invention relates to an electronic watch having a transflective multi-color display capability.

2. Description of Related Art

Conventionally known as a display device is a transflective liquid-crystal display device constructed of a liquid crystal. The liquid-crystal display device is constructed of a polarization axis varying optical device varying its polarization axis, such as a TN (Twisted Nematic) liquid, an STN (Super-Twisted Nematic) liquid crystal and the like. More particularly, the polarization axis varying optical device is interposed between two polarizers, and a semi-transmissive reflector and a light source are respectively arranged on the viewer's side and the opposite side of the liquid-crystal display device. The liquid-crystal display device is used as a reflective display device for example, in outdoor environments where the external light is available, and is used as a transmissive display device with the light source lit where no sufficient external light is available.

The transflective liquid-crystal display device thus constructed suffers dark display during reflective displaying, compared with a reflective liquid-crystal display device without transmissive function. The reason for this is that a reflector used in the conventional transflective liquid-crystal display device is manufactured of a very thin Al (aluminum) or is provided with an opening to assure light transmittance at the expense of brightness during reflective displaying. The conventional transflective liquid-crystal display device has difficulty in presenting a multi-color display both in a reflective display and a transmissive display.

SUMMARY OF INVENTION

The present invention has been developed in view of the above problem, and it is an object of the present invention to provide a very bright display during the reflective displaying in a transflective display device while assuring a multi-color display both in the reflective and the transmissive display.

(1) To achieve the above object, the display device of the present invention comprises:

(a) polarization axis varying means for varying a polarization axis, (b1, b2) first polarizing splitter means and second polarizing splitter means respectively arranged on the front and rear sides of the polarization axis varying means with the polarization axis varying means interposed therebetween; and (c) a light source arranged on the side of the second polarizing splitter means opposed to the polarization axis varying means with the second polarizing splitter means interposed therebetween;

(d) wherein the first polarizing splitter means has the function of transmitting all wavelengths, in the visible light region, of a light ray component linearly polarized in a first direction, and transmitting a specific wavelength, in the visible light region, of a light ray component linearly polarized in a second direction perpendicular to the first direction with the remaining wavelength component not transmitted therethrough.

(e) the second polarizing splitter means has the function of transmitting a light ray component linearly polarized in a third direction while reflecting a light ray component linearly polarized in a direction perpendicular to the third direction; and (f) the light source emits a colored light ray.

The display device thus constructed presents two display states in connection with a light ray coming in from outside the first polarizing splitter means: a first display state that is presented by a light ray which is reflected from the second polarizing splitter means depending on the state of the polarization axis of the polarization axis varying means and a second display state that is presented by a light ray of a specific wavelength only reflected from the second polarizing splitter means, and as a result, a reflective multi-color display is provided.

The first and second display states are presented not by the absorption of light but by the light ray reflected by the second polarizing splitter means, and thus provide an extremely bright display. For example, since the first polarizing splitter means transmits all wavelengths, in the visible light region, of a light ray component linearly polarized in the first direction while transmitting only a specific wavelength, in the visible light region, of a light ray component linearly polarized in a direction (second direction) perpendicular to the first direction, a bright white display is presented in the first display state and a bright colored display is presented in the second display state.

Two display states are available as for the color light from the light source: a third display state which is presented by the color light of the light source which is transmitted through the first polarizing splitter means depending on the state of polarization axis of the polarization axis varying means and a fourth display state which is presented by the state of the first polarizing splitter means that does not transmit a light ray (or the state of the first polarizing splitter means that transmits a predetermined wavelength), and as a result, a transmissive multi-color display is provided.

Besides the four display states, an intermediate tonal display is possible depending on the state of the polarization axis of the polarization axis varying means. The coloration by the first polarizing splitter means is preferably different from the tone of the color light of the light source. This is because the increased number of colors results.

If the element (d) is viewed from a different viewpoint in the above arrangement, the first polarizing splitter means is considered as polarizing splitter means that transmits a light ray component linearly polarized in the predetermined first direction, out of the light ray incident on the first side of the first polarizing splitter means, toward the second side of the first polarizing splitter means opposite to the first side, as a light ray linearly polarized in the first direction, transmits only a specific wavelength of a light ray component linearly polarized in the second direction perpendicular to the first direction, out of the light ray incident on the first side of the first polarizing splitter means, toward the second side of the first polarizing splitter means, transmits a light ray component linearly polarized in the first direction, out of the light ray incident on the second side of the first polarizing splitter means, toward the first side of the first polarizing splitter means, as a light ray linearly polarized in the first direction, and transmits only a specific wavelength of a light ray component linearly polarized in the second direction, out of the light ray incident on the second side of the first polarizing splitter means, toward the first side of the first polarizing splitter means.

If the element (e) is viewed from a different viewpoint, the second polarizing splitter means transmits a light ray component, linearly polarized in a predetermined third direction and coming in from the polarization axis varying means, toward the light source, reflects a light ray component linearly polarized in a fourth direction perpendicular to the third direction toward the polarization axis varying means, and outputs a light ray polarized in the third direction of the light ray coming from the light source toward the polarization axis varying means.

(2) Another display device of the present invention further comprises, in the display device (1), (g) at least one optical element between said polarization axis varying means and said light source.

In the display device (2), the function of the optical element provides a variety of improvements in the display state of the display device. The optical element (g) may be arranged between the polarization axis varying means and the second polarizing splitter means or between the second polarizing splitter means and the light source or two optical elements (g) are arranged, one between the polarization axis varying means and the second polarizing splitter means and the other between the second polarizing splitter means and the light source.

(3) In the display device (2), the optical element is a light scattering body. With this arrangement, in the second display state by the light of the specific wavelength, the light ray transmitted through the second polarizing splitter means is depolarized through the light scattering body, and the reflection of all wavelength light ray component from the second polarizing splitter means toward the polarization axis varying means is thus controlled. As a result, a display of a high color purity is provided by controlling a color mixture between the all wavelength light ray transmitted through the second polarizing splitter means and the specific wavelength light ray reflected from the second polarizing splitter means.

(4) In the display device (2), the optical element is a gray, semi-transmissive, light absorbing and scattering body. With this arrangement, in the second display state by the light of the specific wavelength, the light ray transmitted through the second polarizing splitter means is depolarized through the light scattering and absorbing body, and the reflection from the second polarizing splitter means toward the polarization axis varying means is thus controlled. Since the optical element in this embodiment serves as a light-absorbing body as well, the reflection is also controlled through its absorption. As a result, a display of an even higher color purity is provided by controlling a color mixture between the light ray transmitted through the second polarizing splitter means and the specific wavelength light ray reflected from the second polarizing splitter means.

(5) When a light absorbing and scattering body is used as the optical element, the light absorbing and scattering body has preferably a transmittance to within a range from 10% or greater to 80% or smaller to the light rays in substantially all wavelengths in the visible light region, and has more preferably a transmittance to within a range from 50% or greater to 70% or smaller.

(6) When the above optical element is arranged only between the second polarizing splitter means the light source, the optical element has the function of absorbing the light ray from the second polarizing splitter means and transmitting the light ray from the light source to the second polarizing splitter means. In this way, in the second display state by the specific wavelength light ray, the light ray transmitted through the second polarizing splitter means is absorbed by the light-absorbing body to control the reflection toward the polarization axis varying means. As a result, a display of a high color purity is provided by controlling a color mixture between the light ray transmitted through the second polarizing splitter means and the specific wavelength light ray reflected from the second polarizing splitter means.

(7) "The optical element having the function of absorbing the light ray from the second polarizing splitter means and transmitting the light ray from the light source to the second polarizing splitter means" is produced, for example, by forming an opening, for passing a light ray therethrough, in a light-absorbing body that absorbs light rays of substantially all wavelengths in the visible light region. In this way, in the second display state by the specific wavelength light ray, the light ray transmitted through the second polarizing splitter means is absorbed by the light-absorbing body which absorbs light rays of substantial all wavelengths in the visible light region, and the reflection toward the polarization axis varying means is thus controlled. As a result, a display of a high color purity is provided by controlling a color mixture between the light ray transmitted through the second polarizing splitter means and the specific wavelength light ray reflected from the second polarizing splitter means.

The ratio of the opening to the entire optical element is preferably in a range of 5 to 30%. By setting the distance between the optical element and the light source to be greater than the diameter of the opening, the amount of light ray that is returned back during reflective displaying after being transmitted through the optical element and being reflected from the light source is reduced, and as a result, the color mixture is controlled.

(8) The above optical element is a polarizer with its polarization axis shifted off the second polarizing splitter means. In this way, in the second display state by the specific wavelength light ray, the light ray transmitted through the second polarizing splitter means is absorbed by the polarizer having its polarization axis shifted off the second polarizing splitter means, and the reflection toward the polarization axis varying means is thus controlled. As a result, a display of a high color purity is provided by controlling a color mixture between the light ray transmitted through the second polarizing splitter means and the specific wavelength light ray reflected from the second polarizing splitter means.

(9) In the electronic watches having the arrangements described above, the light source is designed to emit light rays of two or more colors from different portions thereof. In this way, the electronic watch presents a display of two or more colors corresponding to the colored portions of the light source during the transmissive displaying.

(10) "The light source being designed to emit light rays of two or more colors from different portion thereof" may be constructed of, for example, a light guide plate split into at least two portions and LED (Light Emitting Diode) devices corresponding to these split plates. With this arrangement, a display of two or more colors is presented on a display screen corresponding to the split light guide plates in the light source during the transmissive displaying. Because of its small power consumption and easiness in coloration, the LED device is advantageously used in a portable apparatus.

(11) "The light source being designed to emit light rays of two or more colors from different portion thereof" may be constructed of, for example, a plurality of LED devices emitting different color light rays. With this arrangement, a display of two or more colors is presented on a display screen corresponding to the plurality of LED devices emitting different color light rays during the transmissive displaying. As described above, the LED device features a small power consumption and is easy to be colored.

(12) "The light source being designed to emit light rays of two or more colors from different portion thereof" may be constructed of, for example, an EL (Electroluminescence) device having emission areas of at least two or more colors. With this arrangement, a display of two or more colors is presented on a display screen corresponding to the split light guide plates in the light source during the transmissive displaying. Like the LED device, the EL device features a small power consumption and is easy to be colored, and is thus advantageously used in a portable device.

(13) "The light source being designed to emit light rays of two or more colors from different portion thereof" may be constructed of, for example, a plurality of EL (Electroluminescence) devices emitting light rays of different colors. With this arrangement, a display of two or more colors is presented on a display screen corresponding to the plurality of EL (Electroluminescence) devices emitting light rays of different colors during the transmissive displaying. As described above, the EL device features a small power consumption and is easy to be colored.

(14) "The light source being designed to emit light rays of two or more colors from different portion thereof" may be constructed of, for example, at least one LED device and at least one EL (Electroluminescence) device. With this arrangement, a display of two or more colors is presented on a display screen corresponding to the LED device and the EL device during the transmissive displaying. Both the LED device and EL device feature a low power consumption and are easy to be colored as already described above.

(15) Another display device of the present invention comprises:

(a) polarization axis varying means for varying a polarization axis, (b1, b2) first polarizing splitter means and second polarizing splitter means respectively arranged on the front and rear sides of the polarization axis varying means with the polarization axis varying means interposed therebetween;

(c) a light source arranged on the side of the second polarizing splitter means opposed to the polarization axis varying means with the second polarizing splitter means interposed therebetween; and (g1) an optical element between the second polarizing splitter means and the light source;

(d) wherein the first polarizing splitter means has the function of transmitting all wavelengths, in the visible light region, of a light ray component linearly polarized in a first direction, and transmitting a specific wavelength, in the visible light region, of a light ray component linearly polarized in a second direction perpendicular to the first direction with the remaining wavelength component not transmitted therethrough;

(e) the second polarizing splitter means has the function of transmitting a light ray component linearly polarized in a third direction while reflecting a light ray component linearly polarized in a direction perpendicular to the third direction; and (g2) the optical element comprises a coloration layer.

The display device thus constructed presents two display states in connection with a light ray coming in from outside the first polarizing splitter means: a first display state that is presented by a light ray which is reflected from the second polarizing splitter means depending on the state of the polarization axis of the polarization axis varying means and a second display state that is presented by a light ray of a specific wavelength only reflected from the second polarizing splitter means, and as a result, a reflective multi-color display is provided. The first and second display states are presented by the light ray reflected by the second polarizing splitter means, and thus provide an extremely bright display.

Two display states are available as for the color light from the light source: a third display state which is presented by the color light which is transmitted through the first polarizing splitter means depending on the state of polarization axis of the polarization axis varying means, after being colored by the transmission through the optical element as a coloration layer, and a fourth display state which is presented by the state of the first polarizing splitter means that does not transmit a light ray (or the state of the first polarizing splitter means that transmits a predetermined wavelength region), and as a result, a transmissive multi-color display is provided.

As already described, an intermediate tonal display is possible depending on the state of the polarization axis of the polarization axis varying means, and making the coloration by the first polarizing splitter means different from the tone of the color light of the light source increases the number of display colors.

According to the present invention, in the second display state that is presented by the light ray of the specific wavelength only, the coloration layer, namely, the optical element controls the reflection of the light ray transmitted through the second polarizing splitter means toward the polarization axis varying means, thereby controlling a color mixture between the light ray transmitted through the second polarizing splitter means and the specific wavelength light ray reflected from the second polarizing splitter means, and a display of a high color purity is thus provided.

(16) Another display device of the present invention, in connection with the display device (15), has, instead of the optical element comprising the coloration layer (g2), (g3) the optical element having a laminated structure into which a gray semi-transmissive light absorbing and scattering body and a coloration layer are laminated.

Like the optical element described above, this optical element features a variety of functions and advantages including 1) reflective multi-color display capability, 2) transmissive multi-color display capability, 3) an extremely bright display provided by the use of the light ray reflected from the second polarizing splitter means, 4) an intermediate tonal display is possible depending on the state of the polarization axis of the polarization axis varying means and 5) an increased number of display colors by making the coloration by the first polarizing splitter means different from the tone of the color light of the light source.

According to the present invention, in the second display state that is presented by the light ray of the specific wavelength only, the gray semi-transmissive light absorbing and scattering body and the coloration layer depolarize and light-absorb the light ray transmitted through the second polarizing splitter means thereby preventing the light ray from being reflected toward the polarization axis varying means. The color mixture between the light ray transmitted through the second polarizing splitter means and the specific wavelength light ray reflected from the second polarizing splitter means is controlled, and a display of a high color purity is thus provided.

(17) Next, another display device of the present invention, in connection with the display device (15), has, instead of the optical element comprising the coloration layer (g2), (g4) the optical element having a laminated structure into which a light-absorbing body having an opening and a coloration layer are laminated.

Like the optical elements described above, this optical element features a variety of functions and advantages including 1) reflective multi-color display capability, 2) transmissive multi-color display capability, 3) an extremely bright display provided by the use of the light ray reflected from the second polarizing splitter means, 4) an intermediate tonal display is possible depending on the state of the polarization axis of the polarization axis varying means and 5) an increased number of display colors by making the coloration by the first polarizing splitter means different from the tone of the color light of the light source.

According to the present invention, in the second display state that is presented by the light ray of the specific wavelength only, the light-absorbing body having an opening and the coloration layer absorb the light ray transmitted through the second polarizing splitter means thereby preventing the light ray from being reflected toward the polarization axis varying means, and as a result, the color mixture between the light ray transmitted through the second polarizing splitter means and the specific wavelength light ray reflected from the second polarizing splitter means is controlled, and a display of a high color purity is thus provided.

(18) Next, another display device of the present invention, in connection with the display device (15), has, instead of the optical element comprising the coloration layer (g2), (g5) the optical element having a laminated structure into which a polarizer having its polarization axis shifted off the second polarizing splitter means and a coloration layer are laminated.

Like the optical elements described above, this optical element features a variety of functions and advantages including 1) reflective multi-color display capability, 2) transmissive multi-color display capability, 3) an extremely bright display provided by the use of the light ray reflected from the second polarizing splitter means, 4) an intermediate tonal display is possible depending on the state of the polarization axis of the polarization axis varying means and 5) an increased number of display colors by making the coloration by the first polarizing splitter means different from the tone of the color light of the light source.

According to the present invention, in the second display state that is presented by the light ray of the specific wavelength only, the polarizer and the coloration layer absorb the light ray transmitted through the second polarizing splitter means thereby preventing the light ray from being reflected toward the polarization axis varying means, and as a result, the color mixture between the light ray transmitted through the second polarizing splitter means and the specific wavelength light ray reflected from the second polarizing splitter means is controlled, and a display of a high color purity is thus provided.

(19) Next, another display device of the present invention, in connection with the display device (15), has, instead of the optical element comprising the coloration layer (g2), (g6) the optical element comprising a coloration layer and a specular reflector having an opening from the side of said second polarizing splitter means.

Like the optical elements described above, this optical element features a variety of functions and advantages including 1) reflective multi-color display capability, 2) transmissive multi-color display capability, 3) an extremely bright display provided by the use of the light ray reflected from the second polarizing splitter means, 4) an intermediate tonal display is possible depending on the state of the polarization axis of the polarization axis varying means and 5) an increased number of display colors by making the coloration by the first polarizing splitter means different from the tone of the color light of the light source.

According to the present invention, the optical element has a coloration layer and a specular reflector, and in the second display state that is presented by the light ray of the specific wavelength only, the light ray colored by the coloration layer is reflected toward the polarization axis varying means.

(20) Of the above display devices, in the display device of the type that utilizes the coloration layer, the coloration layer is partly colored in two or more colors. With this arrangement, a color display of two or more colors corresponding to the color areas of the coloration layer is presented during the transmissive displaying.

(21) Of the above display devices, in the display device of the type that utilizes the coloration layer, the light source is colored in addition to the coloration layer. With this arrangement, a color display of two or more colors corresponding to the color areas of the coloration layer and the colored light source is presented during the transmissive displaying. For example, by combining a light source emitting a pink light with a red filter layer, a red light source of a high color purity is provided.

(22) Of the above display devices, in the display device of the type that utilizes the first polarizing splitter means, the first polarizing splitter means is constructed of a color polarizer. In this way, a multi-color display is easily produced. As described in the Liquid Crystal Device Handbook (Japan Society for the Promotion of Science, 142nd Committee and The Nikkan Kogyo Shinbun, Ltd.), page 271, figure 4.60, the color polarizer transmits light rays polarized in a first direction in substantial all wavelengths in the visible light region and transmits a light ray component polarized in a second direction perpendicular to the first direction in a specific wavelength in the visible light region with the remaining wavelength component not transmitted therethrough.

For example, shown in figure 4.60 on page 271, in the Liquid Crystal Handbook are color polarizers respectively having no absorption in the red light in the left-hand chart, no absorption in the green light in the center chart, and no absorption in the blue light in the right-hand chart. These color polarizers are generally called a red color polarizer, a green color polarizer and a blue color polarizer.

In the present invention, a blue color polarizer and a violet color polarizer are used.

(23) Of the above display devices, in the electronic watch of the structure that employs a color polarizer as the first polarizing splitter, the color polarizer has at least two colors. A multi-color display corresponding to the color polarizer is thus presented. The color polarizer and a neutral polarizer may be used in combination.

(24) Of the above display devices, in the display device of the present invention that employs the polarization axis varying means, the polarization axis varying means is constructed of a liquid crystal device. A low-cost but high contrast switching device is thus obtained. The polarization axis varying means is preferably constructed of a liquid crystal element, and, is more preferably a TN (Twisted Nematic) liquid crystal, an STN liquid crystal, or an ECB (Electrically Controlled Birefringence) liquid crystal. The STN liquid crystals include the one employing color compensation optically anisotropic material, such as an F-STN (Film Compensated Super-Nematic) liquid crystal.

(25) Of the above display devices, in the display device of the present invention that employs a light source, light condenser means for condensing the light ray from the light source toward the front of the optical element is also employed. With this arrangement, the display by the light ray transmitted from the light source brightens the display and makes the display easy to see.

The surface emitting type EL device may be used as the light source. In this case, the EL device is preferably light green for outstanding color difference if the color polarizer is violet.

Furthermore as the light source, a surface emitting type LED device or a light guide plate and a side light type LED device arranged beside it may be used. When the LED device is red, a blue color polarizer is preferably used because a color difference therebetween forms a striking contrast.

(26) Of the above display devices, in the display of the present invention that employs a light source, the surface of the light source may be darkened. In this way, the reflection from the surface of the light source is restricted, and as a result, the amount of light ray which is transmitted through the optical element and reflected from the light source and then returned is reduced, and a drop in contrast is thus precluded.

(27) Of the above display devices, in the display device of the present invention having a structure that is constructed of the polarization axis varying means and the second polarizing splitter means, a light diffusion layer may be arranged between the polarization axis varying means and the second polarizing splitter means. With this arrangement, the first display state by the external light reflected from the second polarizing splitter means is presented in white through scattering, resulting in a wide viewing angle range.

(28) Next, the electronic watch of the present invention for counting and displaying time comprises:

(a) polarization axis varying means for varying a polarization axis;

(b) first polarizing splitter means and second polarizing splitter means respectively arranged on the front and rear sides of the polarization axis varying means with the polarization axis varying means interposed therebetween; and (c) a light source arranged on the side of the second polarizing splitter means opposed to the polarization axis varying means with the second polarizing splitter means interposed therebetween;

(d) wherein the first polarizing splitter means has the function of transmitting all wavelengths, in the visible light region, of a light ray component linearly polarized in a first direction, and transmitting a specific wavelength, in the visible light region, of a light ray component linearly polarized in a second direction perpendicular to the first direction with the remaining wavelength component not transmitted therethrough;

(e) the second polarizing splitter means has the function of transmitting a light ray component linearly polarized in a third direction while reflecting a light ray component linearly polarized in a direction perpendicular to the third direction; and (f) the light source emits a colored light ray.

The electronic watch thus constructed presents both the reflective multi-color display and the transmissive multi-color display, and the use of the light ray reflected from the second polarizing splitter means permits an extremely bright display, compared with the conventional display that is based on the light absorption through a polarizing splitting member.

(29) Next, another electronic watch of the present invention, in connection with the electronic watch (28), comprises (g) at least one optical element between the polarization axis varying means and the light source.

Since the electronic watch uses, as the optical element, a light scattering body, a gray, semi-transmissive light absorbing and scattering body or the like, the function of the optical element provides a variety of improvements in the display state of the display device.

DETAILED DESCRIPTION OF PREFERRED EMBODIMENTS (First embodiment)

Figure 1:
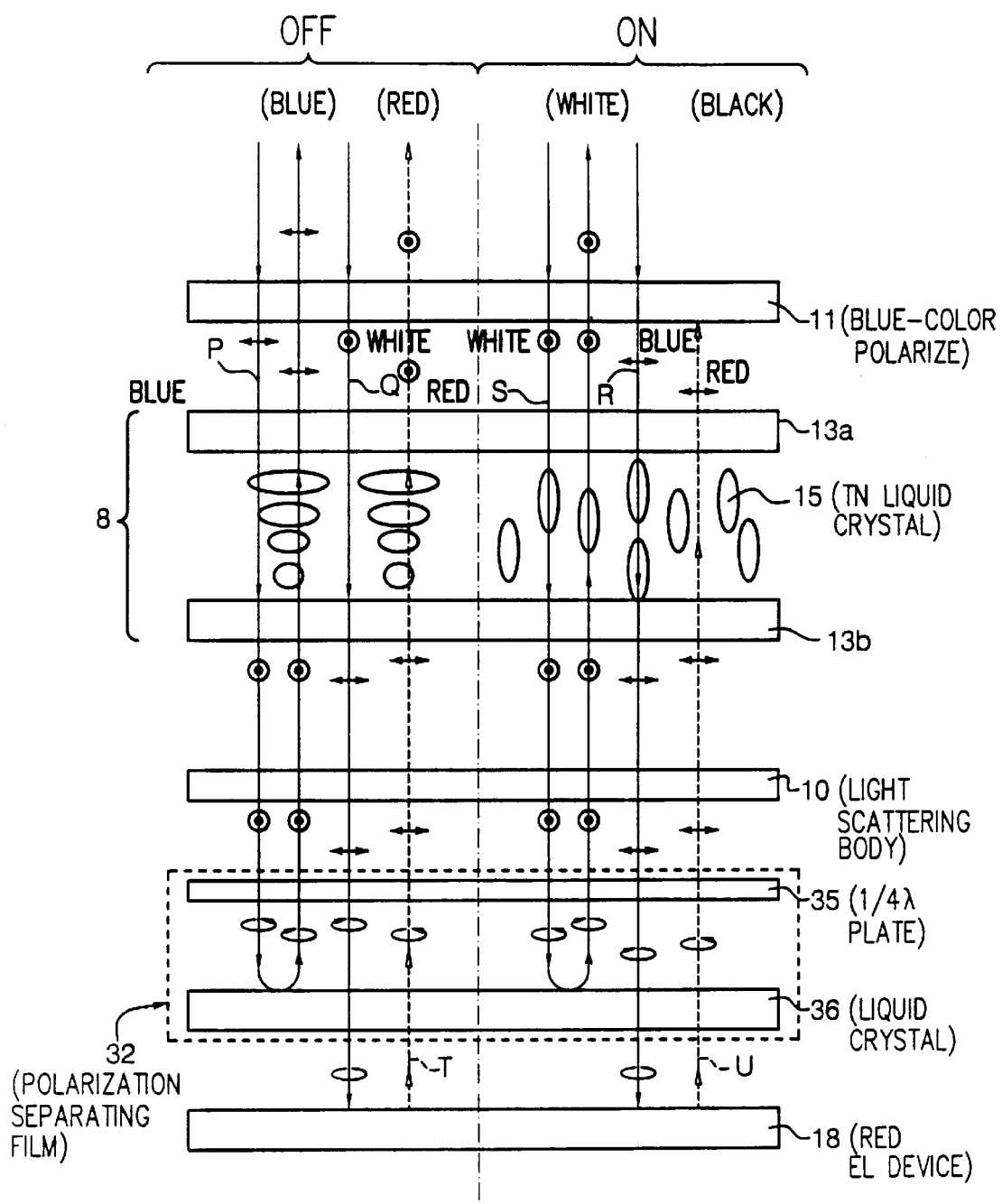
FIG. 1 diagrammatically shows one embodiment of a display device of the present invention.

FIG. 1 shows one embodiment of a display device of the present invention. The display device presents a reflective multi-color display making use of the reflection of the external light on one hand, and a transmissive multi-color display making use of the light ray from a light source on the other hand where no external light is available. The display device is a transflective one. The display device is constructed of a liquid crystal, namely, is a liquid-crystal display device.

The liquid-crystal display device employs a TN (Twisted Nematic) liquid crystal panel 8 as polarization axis varying means. In the TN liquid crystal panel 8, a TN liquid crystal 15 is interposed between two glass substrates 13a and 13b. A blue or bluish color polarizer 11 is arranged on the TN liquid crystal panel 8. Arranged beneath the TN liquid crystal panel 8 is a light scattering body 10, a polarizing splitter 32, and a red EL (Electroluminescence) back light 18.

Figure 2:
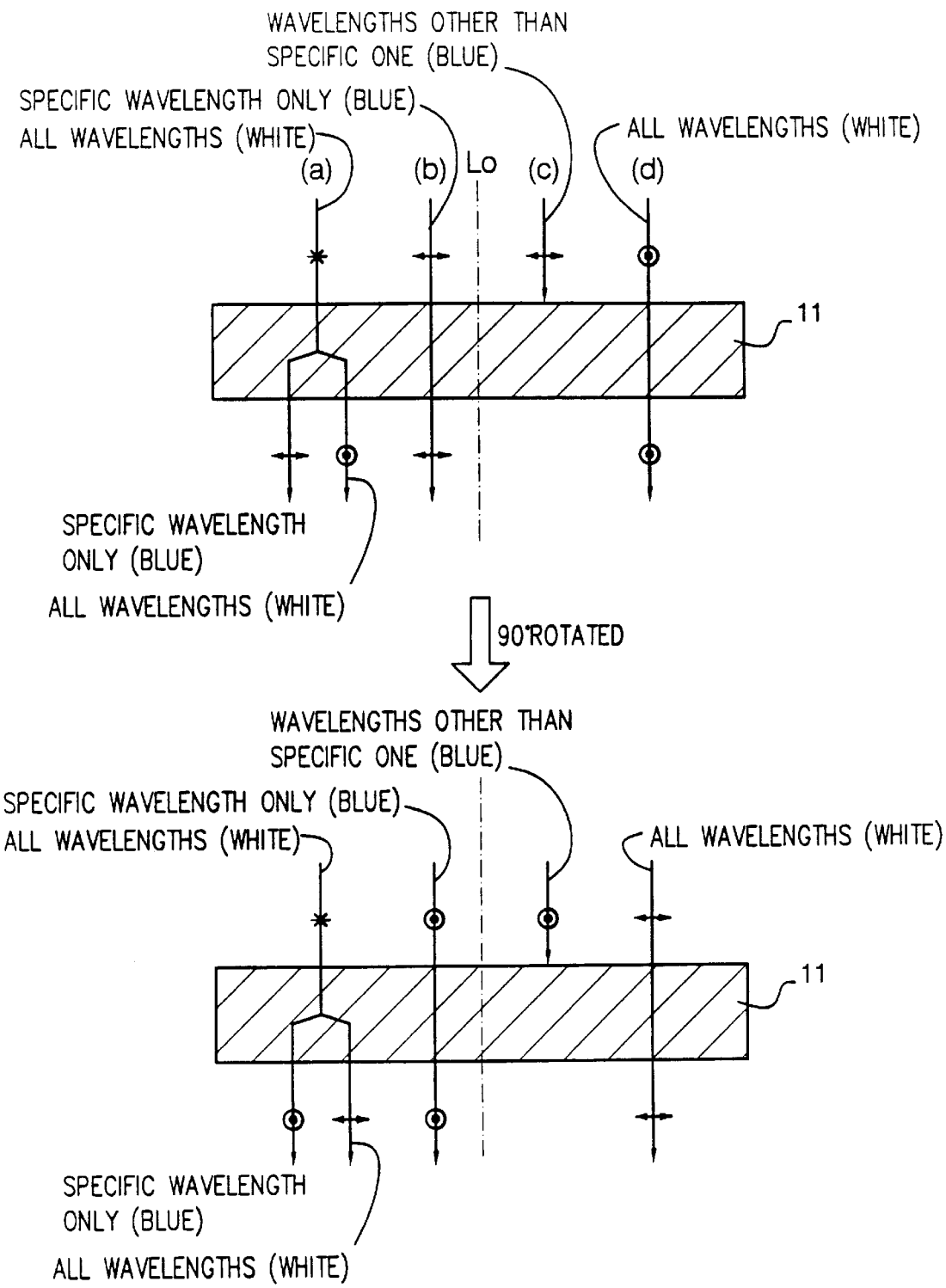
FIG. 2 diagrammatically shows the function of a color polarizer for use in the display device of FIG. 1.

The color polarizer 11 itself is a known polarizer and as represented by reference character (a) in FIG. 2, when the natural light is incident thereon, all wavelengths, in the visible light region, of a light ray component linearly polarized in a predetermined direction (for example, perpendicular to the page) are transmitted therethrough, and on the other hand, only a specific wavelength (for example, blue) in a light ray component linearly polarized in a direction (for example, parallel to the page) perpendicular to the predetermined direction is transmitted therethrough without being absorbed.

In the example shown in FIG. 2, as for the polarized component in the direction (⊚) perpendicular to the page, all wavelengths in the visible light region are transmitted therethrough. As for the polarized component in the direction (↔) parallel to the page, a specific wavelength in the visible light region (for example, blue) is transmitted, and the remaining wavelengths are not transmitted therethrough. When light rays linearly polarized in the direction parallel to the page are incident on the color polarizer 11 as represented by reference characters (b) and (c), a specific wavelength (for example, blue) only is transmitted through the color polarizer 11, light rays other than the specific wavelength are absorbed by the color polarizer 11 and not transmitted the color polarizer 11. When a light ray linearly polarized in the direction perpendicular to the page as represented by reference character (d), light rays of all wavelengths are transmitted through the color polarizer 11.

When the color polarizer 11 is rotated about a central axial line $L_o$ by 90°, the directions of the polarization axes for transmitting or absorbing the linearly polarized are alternated (see the lower portion in FIG. 2). More specifically, as for the linearly polarized light ray in the direction (↔) parallel to the page, all wavelengths are transmitted through the color polarizer 11, and as for the linearly polarized light ray in the direction (⊚) perpendicular to the page, a specific visible-light wavelength (blue) is transmitted.

Where to set the specific wavelength of the color polarizer 11 is freely determined when the color polarizer 11 is manufactured. Used in this embodiment are a color polarizer having no absorption in the blue light wavelength, namely, a blue color polarizer, and a color polarizer having no absorption in the violet wavelength, namely, a violet color polarizer.

Returning to FIG. 1, the back light 18 of this embodiment employs an EL (Electroluminescence) device, and especially when the color polarizer 11 is a blue color polarizer, an EL device emitting a red or reddish color light different from the blue color or a LED (light emitting diode) device emitting a red or reddish color light are used. When a violet color polarizer is used, an EL device emitting a green or greenish color light or a LED device emitting a green or greenish color light may be used as the back light (light emitting means 18).

The polarizing splitter 32 comprises a (¼)λ plate 35 and a cholesteric liquid crystal layer 36. The cholesteric liquid crystal has the characteristic that the liquid crystal reflects a circularly polarized light ray, having the same rotational direction as that of the liquid crystal, of a light ray having a wavelength equal to the pitch of the liquid crystal while transmitting the light rays other than the circularly polarized light ray. For example, when a cholesteric liquid crystal of counterclockwise rotation and having a pitch of 5000 A is used as the cholesteric liquid crystal layer 36, a counterclockwise circularly polarized light ray having a wavelength of 5000 A is reflected while a clockwise circularly polarized light ray and circularly polarized light rays having other wavelengths are transmitted therethrough.

When the counterclockwise rotational cholesteric liquid crystal is used with its pitch in the cholesteric liquid crystal varied over all wavelengths in the visible light region, a counterclockwise circularly polarized light ray of not only a single color light but also a white light is reflected while the clockwise circularly polarized light ray is transmitted therethrough. Used as the cholesteric liquid crystal layer 36 in this embodiment is a counterclockwise rotational cholesteric liquid, the pitch of which is varied in the cholesteric liquid crystal over all wavelengths in the visible light region.

When a light ray linearly polarized in a predetermined first direction is incident on the (¼)λ plate 35 in the polarizing splitter 32 having the cholesteric liquid crystal layer 36 and the (¼)λ plate 35 in combination, the light ray is counterclockwise polarized through the (¼)λ plate, is reflected from the cholesteric liquid crystal layer 36, is again converted back to the light linearly polarized in the predetermined first direction through the (¼)λ plate 35 before exiting outwardly. When a light ray linearly polarized in a second direction perpendicular to the first direction is incident, the light ray is clockwise circularly polarized through the (¼)λ plate 35 and is then transmitted through the cholesteric liquid crystal layer 36. In response to a light ray incident on the cholesteric liquid crystal layer 36 from below, the (¼)λ plate 35 outputs a light ray linearly polarized in the second direction.

The polarizing splitter 32 having the cholesteric liquid crystal layer 36 and the (¼)λ plate 35 in combination is polarizing splitter means which transmits the light ray component linearly polarized in the predetermined second direction out of the light ray coming in from the (¼)λ plate 35 while reflecting the light ray component linearly polarized in the first direction perpendicular to the second direction, and outputs a light ray linearly polarized in the second direction to the (¼)λ plate 35 in response to the light ray coming in from the cholesteric liquid crystal layer 36.

Besides the polarizing splitter 32 having the cholesteric liquid crystal layer 36 and the (¼)λ plate 35 in combination, the polarizing splitter means having such a function may be one of a laminated film structure constructed of multiple films (U.S. Pat. No. 4,974,219), means for splitting a light into a reflected polarized light and a transmitted polarized light taking advantage of the Brewster's angle (SID 92 DIGEST, pages 427 to 429), means employing the hologram, and means as disclosed in International Applications (International Application Nos. WO95/27819 and WO95/17692).

The operation of the liquid-crystal display device is now discussed with the right half of the liquid-crystal display device as a voltage applied (ON) area and with the left half as a non-voltage applied (OFF) area.

(Reflective display using the external light)

Discussed is the reflective multi-color display with the external light incident on the liquid-crystal display device when the natural light rather than the emission of the light emitting means is used. When the external light is incident on the liquid-crystal display device in the left-hand non-voltage applied (OFF) area, the external light is decomposed by the blue or bluish color polarizer 11 into a light ray P linearly polarized in a direction (↔) parallel to the page (a short visible-light wavelength only) Al and a light ray Q linearly polarized in a direction (◉) perpendicular to the page (all visible-light wavelengths).

The light ray represented by the leftmost arrow (pointing downward) shown in FIG. 1 is the light ray P linearly polarized in a direction (↔) parallel to the page (the short visible-light wavelength only), and is incident on the liquid crystal layer 8, is twisted in polarization direction by 90° by the TN liquid crystal 15 to be a light ray linearly polarized in a direction perpendicular to the page, is counterclockwise circularly polarized by the (¼)λ plate 35, is reflected by the cholesteric liquid crystal layer 36, and is incident again on the (¼)λ plate 35 to be converted into a light ray linearly polarized in a direction perpendicular to the page by the (¼)λ plate 35, is incident on the liquid crystal layer 8, is twisted in polarization direction by 90° by the TN liquid crystal 15 to a light ray linearly polarized in a direction parallel to the page, and then exits as a light ray linearly polarized in a direction parallel to the page from a blue or bluish color polarizer 11. This is presented in a blue display (a light ray represented by a second arrow (pointing upward) from the left in FIG. 1).

The light ray represented by a third arrow (pointing downward) from the left in FIG. 1 is the light ray Q linearly polarized in a direction (◉) perpendicular to the page (all visible-light wavelengths), and is incident on the liquid crystal layer 8, is twisted in polarization direction by 90° by the TN liquid crystal 15 to be a light ray linearly polarized in a direction parallel to the page, is counterclockwise circularly polarized by the (¼)λ plate 35, and is transmitted through the cholesteric liquid crystal layer 36. The light ray then reaches the back light 18, and is scattered or absorbed by the back light 18 depending on the condition of the surface of the back light 18, and most of the light ray is unable to return to the blue color polarizer 11 in either way. For this reason, in the reflective display using the external light, the non-voltage applied (OFF) area is presented in blue based on the polarized light ray P.

When the external light is incident on the liquid crystal display device in the right-hand voltage applied area, the external light is decomposed by the blue or bluish color polarizer 11 into a light ray R linearly polarized in a direction parallel to the page (the short visible-light wavelength only) and a light ray S linearly polarized in a direction perpendicular to the page (substantially all visible-light wavelengths).

The light ray S linearly polarized in a direction perpendicular to the page (substantially all visible-light wavelengths) out of the third light ray (pointing downward) from the right above the blue color polarizer 11 in FIG. 1 is incident on the liquid crystal layer 8, is transmitted through the TN liquid crystal 15 without changing its polarization direction, counterclockwise circularly polarized by the (¼)λ plate 35, is reflected by the cholesteric liquid crystal layer 36, is incident again on the (¼)λ plate 35, is converted to be a light ray linearly polarized in a direction perpendicular to the page by the (¼)λ plate 35, is incident again on the liquid crystal layer 8, is transmitted through the TN liquid crystal 15 without changing its polarization direction, and exits as a light ray linearly polarized in a direction perpendicular to the page from the color polarizer 11. This is presented as a white display.

On the other hand, the light ray R linearly polarized in a direction parallel to the page (the short visible-light wavelength only) of the rightmost light ray above the blue color polarizer in FIG. 1 is incident on the liquid crystal layer 8, is transmitted through the TN liquid crystal 15 without changing its polarization direction, clockwise circularly polarized by the (¼)λ plate 35, and is transmitted through the cholesteric liquid crystal layer 36. The light ray is then scattered or absorbed by the back light 18 with most of it unable to return to the blue color polarizer 11 in the same way as the light ray Q in the voltage-off state. For this reason, the voltage applied (ON) area during the reflection is presented in white based on the polarized light ray S.

In this way, the reflective display with the external light incident on the liquid-crystal display device presents a blue display in the non-voltage applied area and a white display in the voltage applied area. When the voltage is applied, the external light incident on the liquid-crystal display device is not absorbed but reflected by the polarizing splitter 32, resulting in a bright display.

(Transmissive display using the back light)

The transmissive multi-color display using the light from the red or reddish EL back light 18 is now discussed.

In the left-hand non-voltage applied area, a light T from the EL back light 18 is incident on the cholesteric liquid crystal layer 36 of the polarizing splitter 32, and a clockwise circularly polarized light ray only is transmitted through the cholesteric liquid crystal layer 36, is converted into a light ray linearly polarized in a direction parallel to the page by the (¼)λ plate 35, is twisted in polarization direction by 90° by the TN liquid crystal 15 to be a light ray linearly polarized in a direction perpendicular to the page, and this light ray is transmitted through the blue or bluish polarizer 11. This is because the blue or bluish color polarizer 11 is arranged to transmit the light ray polarized in a direction perpendicular to the page over the substantially overall visible light region. More particularly, the wavelength of red that is the emission color is also transmitted therethrough, presenting a red display (a fourth light ray from the left in FIG. 1).

In the right-hand voltage applied area, a light U from the red or reddish EL back light 18 is incident on the cholesteric liquid crystal layer 36, and a clockwise circularly polarized light ray only is transmitted through the cholesteric liquid crystal layer 36, is converted into a light ray linearly polarized in a direction parallel to the page by the (¼)λ plate 35, is transmitted through the light scattering body 10, is then transmitted through the TN liquid crystal 15, and is blocked by the blue color polarizer 11. This is because the blue or bluish color polarizer 11 is arranged to transmit the light ray polarized in a direction parallel to the page on a blue wavelength only. More particularly, the red wavelength is absorbed, presenting a black display (the rightmost light ray in FIG. 1).

In the transmissive display by the light from the red or reddish EL back light 18, the red emission color of the back light 18 is presented in black in the voltage applied (ON) area as a result of the absorption by the blue color polarizer 11, and is presented in the emission color of the EL back light, namely, red in the non-voltage applied (OFF) area as a result of the transmission through the blue color polarizer 11.

The liquid-crystal display device is thus a reflective liquid-crystal display device provided with transflective functions, in which a bright reflective multi-color display is presented taking advantage of the reflection of the external light when the external light is available while a transmissive multi-color display from the light of the colored EL back light 18 is presented when no external light is available. Although a blue color polarizer 11 is employed in this embodiment, any color polarizer may be employed as long as it absorbs a specific wavelength in the visible light region.
(Second embodiment)

Figure 3:
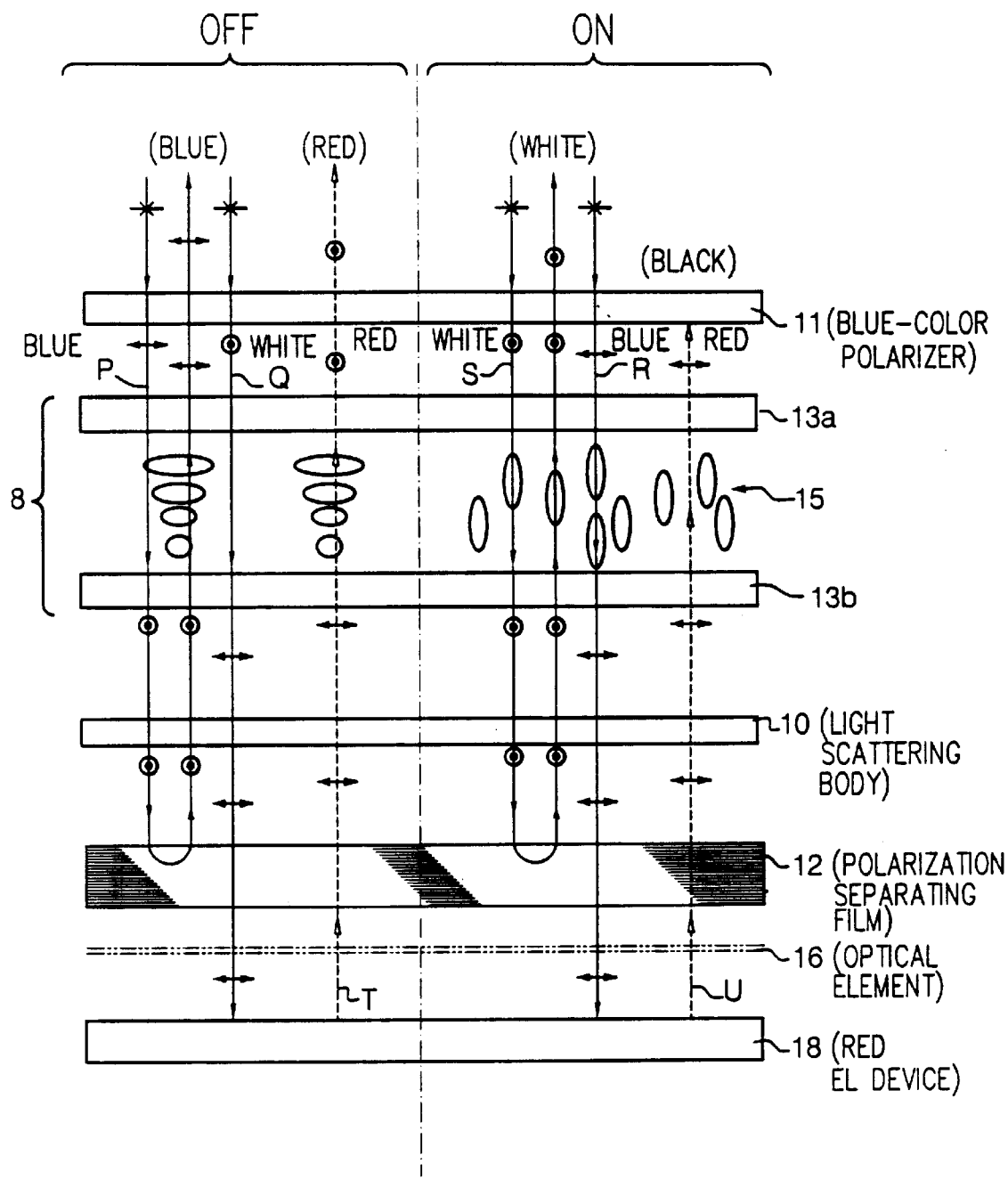
FIG. 3 diagrammatically shows another embodiment of the display device of the present invention.

FIG. 3 shows another embodiment of the display device of the present invention. In the embodiment shown in FIG. 1, the polarizing splitter 32 having the cholesteric liquid crystal layer 36 and the (¼)λ plate 35 is used, but in this embodiment, instead of the polarizing splitter 32, a polarizing splitter identical to the one disclosed in International Publications of International Applications (International Application Nos. WO95/27819 and WO95/17692), namely, a polarizing splitter film 12 is used, this point is different from the embodiment shown in FIG. 1. The rest of the second embodiment remains unchanged from that of the first embodiment, and like components are designated by like reference characters.

The polarizing splitter film 12 transmits a light ray linearly polarized in one direction while not absorbing but reflecting the remainder of the linearly polarized light rays, particularly totally reflecting the light ray linearly polarized in a direction perpendicular to the polarization axis. If viewed from a different viewpoint, the polarizing splitter film 12 is polarizing splitter means that transmits a light ray component linearly polarized in a predetermined second direction, of the light ray coming in from above, as the linearly polarized light ray in the second direction, reflecting a light ray linearly polarized in a first direction perpendicular to the second direction, and outputs a light ray linearly polarized in the second direction in response to the light ray coming in from below.

In FIG. 3, the polarizing splitter film 12 reflects a light ray component linearly polarized in a direction (◉) perpendicular to the page and transmits a light ray linearly polarized in a direction (↔) parallel to the page. Since the polarization axis (↔) of the polarizing splitter film 12 and the polarization axis (↔) of the blue polarization axis of the blue color polarizer are parallel to each other, the blue color is reflected by the polarizing splitter film 12 and looks blue with the voltage off when the external light is used, and the white color is reflected by the polarizing splitter film 12 and looks white with the voltage on. On the other hand, when the polarization axis of the polarizing splitter film 12 and the blue polarization axis of the blue color polarizer are perpendicular to each other, the colors are reversed between voltage on and voltage off.

Figure 4:
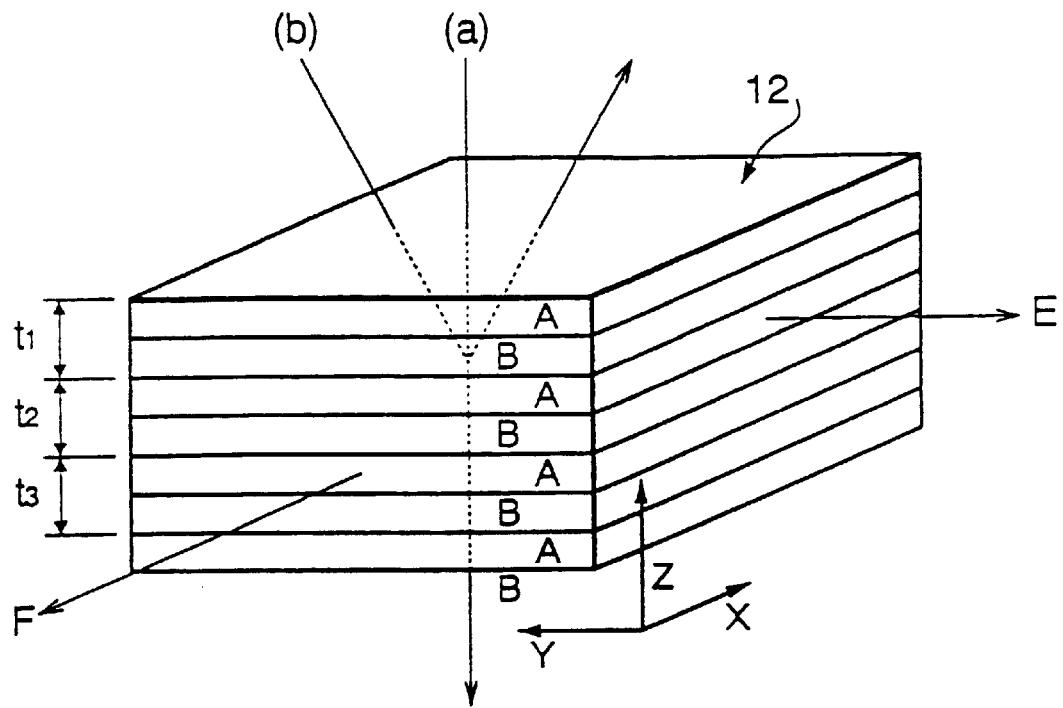
FIG. 4 diagrammatically shows the function of a polarizing splitter films used in the display device of FIG. 3.

As shown in FIG. 4, the polarizing splitter film 12 has a multi-layered structure into which two types of layers A and B are alternately laminated, and two adjacent layers of a plurality of layers are equal to each other in refractive index in one direction, but different from each other in refractive index in a direction perpendicular to the one direction, and the plurality of layers are varied from layer to layer in thickness.

Referring to FIG. 4, considering three mutually perpendicular axis directions XYZ, two layers A and B are laminated using an extrusion molding technique, and stretched in one direction (X direction, for example), but not stretched in another direction (Y direction, for example). Namely, the X direction is a stretching direction, and the Y direction is transverse to it. The material of the B layer has a refractive index of $n_B$ ($n_B$=1.64, for example), and remains unchanged regardless of the stretching process. On the other hand, the material of the A layer has a refractive index varying through the stretching process. When a sheet of the A material is stretched in one axis, for example, it has a refractive index of $n_{AX}$ ($n_{AX}$=1.88, for example) in the stretching direction (the X direction, for example) and a different refractive index of $n_{AY}$ ($n_{AY}$=1.64, for example) in the transverse direction (the Y direction).

When the multi-layered structure constructed of A and B materials shown in FIG. 4 is stretched in the X direction, a large refractive index difference Δn=1.88−1.64=0.24 is generated in the stretching direction. On the other hand, the refractive index difference between A and B layers in the Y direction perpendicular to the stretching direction is Δn=1.64−1.64=0, and thus no refractive index difference takes place. For such optical characteristics, when a light ray is incident on the polarizing splitter film 12, a polarized component (a) having a transmission axis E of the incident light ray is transmitted through the polarizing splitter film 12. A polarized component (b) having an absorption axis F of the incident light ray is subject to the refractive index difference Δn, and is reflected therefrom for this reason.

Figure 5:
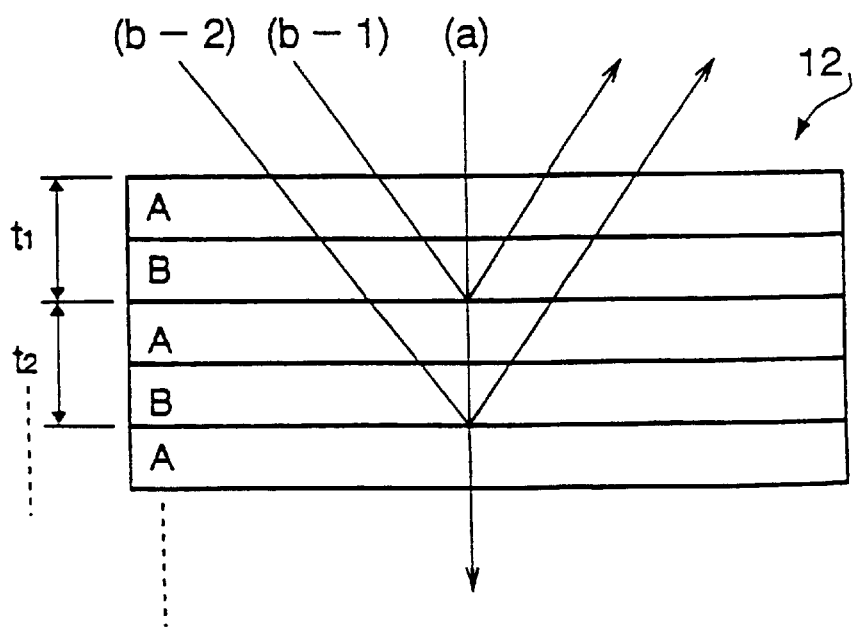
FIG. 5 is a cross-sectional view of the polarizing splitter film of FIG. 4.

The layers A and B are individually slightly varied to be t1, t2, t3, ..., and for this reason, light rays of different wavelengths (b-1), (b-2), ... are reflected from layer boundaries as shown in FIG. 5. More particularly, light rays of in a wide wavelength range are efficiently reflected by the multi-layered structure of two types of layers of A and B. In the polarizing splitter film 12 of this embodiment, the layers of thicknesses of t1, t2, t3, ... are set such that light rays of virtually all wavelengths in the visible light region are reflected.

The side of the polarizing splitter film 12 facing the liquid crystal panel 8 may be a smooth surface for specular reflection or a light scattering layer, namely, a light diffusion layer. When it is a smooth surface, an image reflected from the polarizing splitter film 12 is a specular reflection image. When it is a light diffusion layer, a image reflected from the polarizing splitter film 12 is a single (typically white) background color with no pattern. With a color layer arranged on the surface of the polarizing splitter film 12, any appropriate coloration may be added.

The operation of the liquid-crystal display device is now discussed with the right half of the liquid crystal panel 8 of the liquid-crystal display device as a voltage applied (ON) area and with the left half as a non-voltage applied (OFF) area.

Generally, to present the background on the display screen, the corresponding area of the liquid crystal panel 8 is set to OFF and to present numeric information and the like on the display screen, the corresponding area of the liquid crystal panel 8 is set to ON.
(Reflective display using the external light)

Returning to FIG. 3, the operation of the reflective multi-color display with the external light incident on the liquid-crystal display device is now discussed. When the external light is incident on the liquid-crystal display device in the left-hand non-voltage applied (OFF) area, the external light is decomposed by the blue or bluish color polarizer 11 into a light ray P linearly polarized in a direction (↔) parallel to the page and a light ray Q linearly polarized in a direction (◉) perpendicular to the page. In this case, the light ray P linearly polarized in a direction parallel to the page includes a short visible-light wavelength only, particularly, a wavelength corresponding to blue. The light ray Q linearly polarized in a direction perpendicular to the page includes all visible-light wavelengths, namely, a white light.

The light ray P polarized in a direction parallel to the page is incident on the liquid crystal layer 8, and is twisted in polarization direction by 90° by the TN liquid crystal 15 to be a light ray linearly polarized in a direction perpendicular to the page. This linearly polarized light ray is transmitted through the light scattering body 10 and reaches the polarizing splitter film 12. The linearly polarized light ray is reflected from the interlayer boundaries of the polarizing splitter film 12 depending on its wavelengths, and the reflected light ray is introduced into the light scattering body 10 and then to the liquid crystal panel 8, and is twisted by the TN liquid crystal 15 to a direction parallel to the page, is transmitted through the blue color polarizer 11, and exits outwardly for display. In this way, the OFF area is presented in the color of the color polarizer 11, namely, in blue.

The light ray Q linearly polarized in a direction perpendicular to the page is incident on the liquid crystal layer 8, is twisted in polarization direction by 90° by the TN liquid crystal 15 to be a light ray linearly polarized in a direction parallel to the page, and is thus transmitted through the polarizing splitter film 12, and reaches the back light 18. The light ray then reaches the back light 18, and is scattered or absorbed by the back light 18 depending on the condition of the surface of the back light 18, and most of the light ray is unable to return to the color polarizer 11 in either way. For this reason, in the reflective display using the external light, the non-voltage applied (OFF) area is presented in blue based on the polarized light ray P.

When the external light is incident on the liquid crystal display device in the voltage applied (ON) area, the external light is decomposed by the blue or bluish color polarizer 11 into a light ray R linearly polarized in a direction parallel to the page and a light ray S linearly polarized in a direction perpendicular to the page. In this case, the light ray R linearly polarized in a direction parallel to the page includes a short visible-light wavelength only, particularly, a wavelength corresponding to blue. The light ray S linearly polarized in a direction perpendicular to the page includes all visible-light wavelengths, namely, a white light.

The light ray S linearly polarized in a direction perpendicular to the page is transmitted through the TN liquid crystal 15 without changing its polarization direction, is then transmitted through the light scattering body 10, and is reflected from the polarizing splitter film 12 by wavelength. The reflected light (all wavelengths) is again introduced into the light scattering body 10 and the liquid crystal panel 8, is transmitted through the TN liquid crystal 15 without being twisted, remaining in a direction perpendicular to the page, is transmitted through the blue color polarizer 11, and exits outwardly. Since the linearly polarized light ray includes all wavelengths, the display color is white.

The light ray R linearly polarized in a direction parallel to the page is transmitted through the TN liquid crystal 15 without changing its polarization direction, is transmitted through the polarizing splitter film 12, and reaches the back light 18. This light ray is scattered and absorbed on the surface of the back light 18, contributing almost nothing to the display outside. During the reflective displaying with the external light used, the voltage applied (ON) area is presented in white based on the polarized light ray S.

In this way, the reflective display with the external light incident on the liquid-crystal display device presents a blue display in the non-voltage applied (OFF) area and a white display in the voltage applied (ON) area. In either display, the external light incident on the liquid-crystal display device is not absorbed but reflected by the polarizing splitter film 12, resulting in a bright display.

(Transmissive display using the back light)

A transmissive multi-color display using the light ray from the red or reddish back light 18 is now discussed. Referring to FIG. 3, in the non-voltage applied (OFF) area, the light ray T from the EL back light 18 is transmitted through the polarizing splitter film 12, becomes a light ray polarized in a direction parallel to the page, which is then twisted in polarization direction by 90° by the TN liquid crystal 15 to be a light ray linearly polarized in a direction perpendicular to the page, which is then transmitted through the blue or bluish color polarizer 11. This is because the blue or bluish color polarizer 11 is arranged to transmit the light ray polarized in a direction perpendicular to the page over substantially all visible-light wavelengths. More particularly, the wavelength of red that is the emission color is also transmitted therethrough, presenting a red display.

On the other hand, in the voltage applied (ON) area, the light ray U from the red or reddish EL back light 18 is transmitted through the polarizing splitter film 12, becoming a light ray polarized in a direction parallel to the page, and then the light ray is transmitted through the light scattering body 10, is transmitted through the TN liquid crystal 15 without changing its polarization direction, and is then absorbed and thus blocked by the blue or bluish color polarizer 11. This is because the blue or bluish color polarizer 11 is arranged to transmit the light ray polarized in a direction parallel to the page on a blue wavelength only. More particularly, the red wavelength is absorbed, and is recognized as a black display from the outside.

In the transmissive display using the light ray from the back light 18, the red color light from the back light 18 in the voltage applied (ON) area is absorbed by the blue or bluish color polarizer 11 presenting a black display and is transmitted through the blue or bluish color polarizer 11 in the non-voltage applied (OFF) area, presenting a display in the emission color of the EL back light 18, namely in red. The liquid-crystal display device presents a bright reflective multi-color display taking advantage of the reflection of the external light when the external light is available, and presents a transmissive multi-color display making use of the light ray from the colored back light 18 when no external light is available. The liquid-crystal display device works as a reflective liquid crystal display with transflective functions.

Although this embodiment has been discussed in connection with two states of voltage applied areas and non-voltage applied areas, an intermediate tonal display is also possible. Although a blue or bluish color polarizer 11 is employed in this embodiment, any color polarizer may be employed as long as it absorbs a specific wavelength in the visible light region.

For example, a violet or near violet color polarizer 11 may be used and a light green EL device or a green LED may be used for the back light. In this case, with the back light on and off, the voltage-off area alternates between green (back light on) and violet (back light off). The voltage-on area alternates between black (back light on) and white (back light off). Depending on whether the back light is on or off, the color sharply changes, presenting an easy-to-see display to a user.

In the above discussion, the liquid crystal panel using the TN liquid is used as the polarization axis varying means, but alternatively, a liquid crystal panel employing an STN liquid crystal or ECB liquid crystal may be used. As the STN liquid crystal, a color compensation optically anisotropic material, such as an F-STN (Film Compensated Super-Nematic) liquid crystal, is preferable.

A cold cathode tube, a LED device or the like may be used as the back light 18.

In the above discussion, the polarizing splitter film 12 and the back light 18 are put into direct contact with each other. Instead of this arrangement, an optical element 16 may be interposed therebetween. Contemplated as the optical element 16, for example, is one of 1) a light scattering body, 2) a gray, semi-transmissive light-absorbing body, 3) a black light-absorbing body having an opening, and 4) a polarizer with its polarization axis shifted off the polarizing splitter film 12.

By arranging one of these various optical elements between the polarizing splitter film 12 and the back light 18, the light from the liquid crystal panel 8 is absorbed or scattered while the light from the back light 18 is transmitted toward the liquid crystal panel 8, and as a result, a high contrast display is provided.

When the black light-absorbing body having a plurality of openings is arranged between the polarizing splitter film 12 and the back light 18, the ratio of the area of the openings to the entire area of the light-absorbing body is preferably limited. With this arrangement, the amount of light ray which is transmitted through the openings of the light-absorbing body and reflected from the back light 18 and then returned is reduced, and a drop in contrast is thus precluded. Preferably, by lengthening the distance between the light-absorbing body and the back light, the amount of light that is transmitted through the light-absorbing body, reflected from the back light 18 and returned is reduced, and a drop in contrast is thus precluded.

Preferably, by darkening the color of the surface of the back light 18, the reflection from the surface of the back light 18 is restricted, and as a result, the amount of light ray which is transmitted through the polarizing splitter film 12 and reflected from the back light 18 and then returned is reduced, and a drop in contrast is thus precluded.

Preferably, means for condensing the light ray from the back light 18 toward the front of the liquid-crystal display device is further employed. When the reflective display using the external light is viewed, it is typically viewed at an angle to the normal to the front surface of the liquid-crystal display device. If the liquid-crystal display device is viewed right at the normal to its front surface, the travel of the external light incident on the liquid-crystal display device is blocked by the user, and the reflective display using the external light is darkened.

When the display using the transmitted light from the back light 18 is viewed, the liquid-crystal display device is typically viewed right at the normal to its surface, and with the condenser means for condensing the light ray from the back light 18 toward the front of the liquid-crystal display device, the display using the transmitted light from the back light 18 is brightened, and as a result, the transmissive display from the light from the back light 18 is easy to see at the normal to the front surface of the liquid-crystal display device. For example, a prism sheet is preferable as the means for condensing the light ray from the back light 18 toward the front of the liquid-crystal display device.

(Third embodiment)

Figure 6:
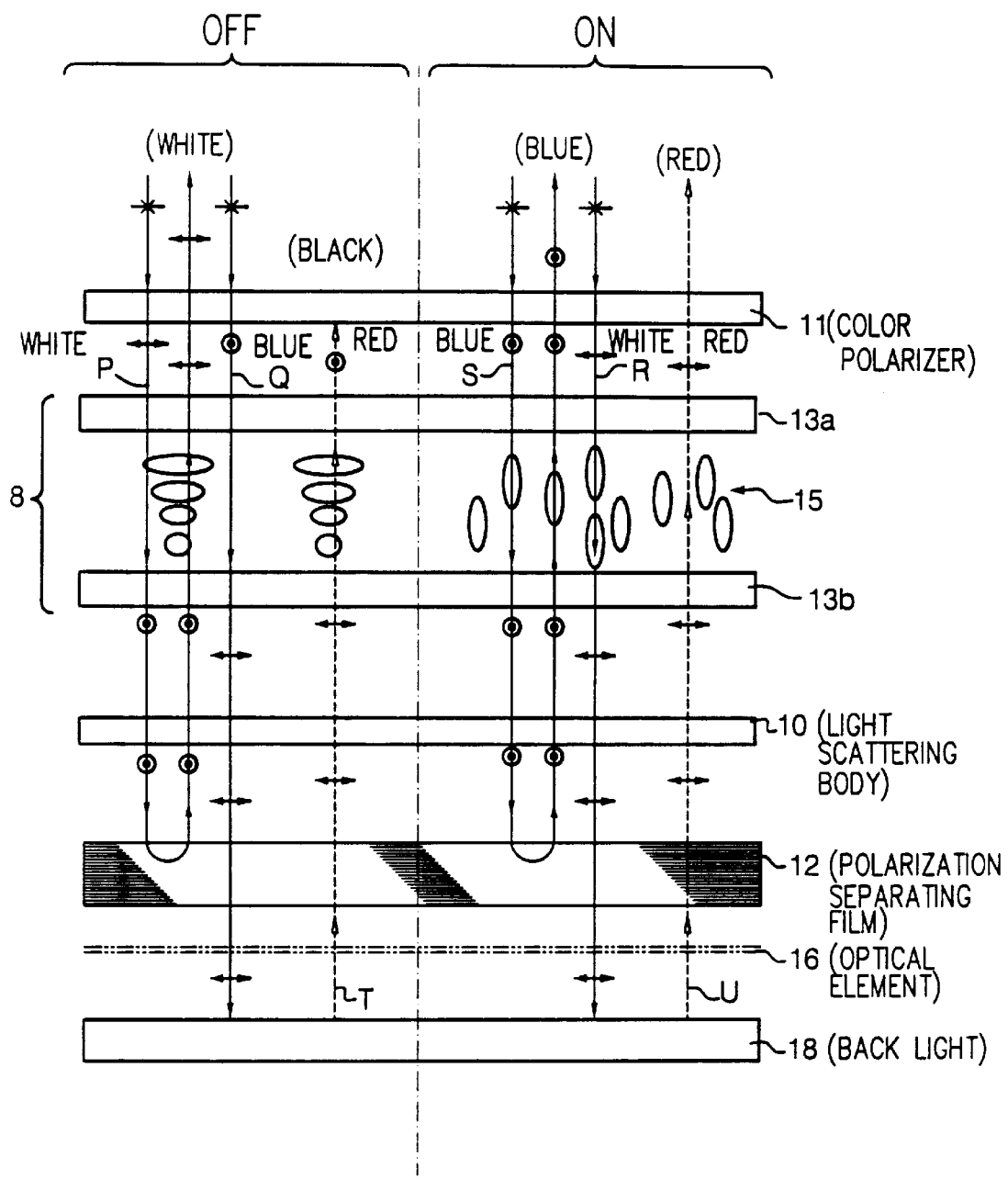
FIG. 6 shows yet another embodiment of the display device of the present invention.

FIG. 6 is another embodiment of the liquid-crystal display device of the present invention. This embodiment is a modification of the embodiment shown in FIG. 3, and the difference from the embodiment shown in FIG. 3 is that the polarization direction of the blue or bluish color polarizer 11 is rotated by 90° from the setting shown in FIG. 3. The blue polarization axis of the blue color polarizer 11 is perpendicular to the page while the polarization axis of the polarizing splitter film 12 is parallel to the page with the two axes perpendicular to each other. In this case, the operations in the voltage-on area and voltage-off areas in FIG. 3 respectively correspond to the operations in the voltage-off areas and voltage-on areas in FIG. 6.

As shown in FIG. 3, the reflective multi-color display using the reflection of the external light and the transmissive multi-color display using the light ray from the back light are separately discussed.

(Reflective display using the external light)

The reflective multi-color display with the external light incident on the liquid-crystal display device is now discussed. When the external light is incident on the liquid-crystal display device in the non-voltage applied (OFF) area, the external light is decomposed by the blue or bluish color polarizer 11 into a light ray P linearly polarized in a direction parallel to the page and a light ray Q linearly polarized in a direction perpendicular to the page. In this embodiment which is different from the embodiment shown in FIG. 3, the light ray P linearly polarized in a direction parallel to the page, including substantially all wavelengths in the visible light region, is a white light, and the light ray Q linearly polarized in a direction perpendicular to the page includes a short visible-light wavelength, particularly a wavelength corresponding to blue.

The light ray P linearly polarized in a direction parallel to the page is twisted in polarization direction by 90° by the TN liquid crystal 15 to be a light ray linearly polarized in a direction perpendicular to the page, is reflected from the polarizing splitter film 12 as is, is twisted in polarization direction by 90° by the TN liquid crystal 15 to be a light ray linearly polarized in a direction parallel to the page, and exits from the blue color polarizer 11 as a light ray linearly polarized in a direction parallel to the page. This light ray gives a white display.

On the other hand, the light ray Q linearly polarized in a direction perpendicular to the page is twisted in polarization direction by 90° by the TN liquid crystal 15 to be a light ray linearly polarized in a direction parallel to the page, is transmitted through the polarizing splitter film 12, reaches the back light 18, and is scattered and absorbed there, and most of the light ray is unable to return to the color polarizer 11. As a result, the non-voltage applied (OFF) area during the reflective displaying is a white display.

When the external light is incident on the liquid-crystal display device in the voltage applied (ON) area, the external light is decomposed by the blue or bluish color polarizer 11 into a light ray R linearly polarized in a direction parallel to the page and a light ray S linearly polarized in a direction perpendicular to the page. In this embodiment which is different from the embodiment shown in FIG. 3, the light ray R linearly polarized in a direction parallel to the page, including substantially all visible-light wavelengths, is a white light, and the light ray S linearly polarized in a direction perpendicular to the page includes a short visible-light wavelength, particularly a wavelength corresponding to blue.

The light ray S linearly polarized in a direction perpendicular to the page is transmitted through the TN liquid crystal 15 without changing its polarization direction and reaches the polarizing splitter film 12, where the light ray is reflected from interlayer boundaries of the polarizing splitter film 12 by wavelength. The reflected light ray is then transmitted through the TN liquid crystal 15 without changing its polarization direction and exits from the color polarizer 11 as a light ray linearly polarized in a direction perpendicular to the page. This light ray is presented as a blue display.

On the other hand, the light ray R linearly polarized in a direction parallel to the page is transmitted through the TN liquid crystal 15 without changing its polarization direction and reaches the back light 18, where the light ray is scattered and absorbed, with most of it is unable to return to the color polarizer 11. As a result, the voltage applied (ON) area during the reflective displaying is presented as a blue display.

As described above, the reflective display with the external light incident on the liquid-crystal display device presents the non-voltage applied (OFF) area in white and the voltage applied (ON) area in blue. In either case, the external light incident on the liquid-crystal display device is not absorbed but reflected by the polarizing splitter film 12, presenting an extremely bright display.

(Transmissive display using the back light)

A transmissive multi-color display using the light ray from the red EL back light 18 is now discussed. In the non-voltage applied (OFF) area, the light T from the EL back light 18 is incident on the polarizing splitter film 12, becoming a light ray linearly polarized in a direction parallel to the page, which is then twisted in polarization direction by 90° by the TN liquid crystal 15, and the light ray is then blocked by the blue or bluish color polarizer 11. This is because the blue or bluish color polarizer 11 is arranged to transmit the light ray polarized in a direction perpendicular to the page on a blue wavelength only. More particularly, the red wavelength is absorbed, and is recognized as a black display from the outside.

On the other hand, in the voltage applied (ON) area, the light ray U from the red or reddish EL back light 18 is incident on the polarizing splitter film 12, becoming a light ray linearly polarized in a direction parallel to the page, which is then transmitted through the light scattering body 10, is transmitted through the TN liquid crystal 15 without changing its polarization direction, and is transmitted through the blue or bluish color polarizer 11. This is because the blue or bluish color polarizer 11 is arranged to transmit the light ray polarized in a direction parallel to the page on substantially all visible-light wavelengths. The red light from the back light 18, transmitted through the color polarizer 11, results in a red display on screen.

In the transmissive display based on the light from the red or reddish EL back light 18, the red light from the back light 18 in the non-voltage applied (OFF) area is absorbed by the blue or bluish color polarizer 11 presenting a black display, and in the voltage applied (ON) area is transmitted through the blue or bluish color polarizer 11 presenting a display in the emission color of the EL back light 18, namely in red.

The liquid-crystal display device presents a bright reflective multi-color display taking advantage of the reflection of the external light when the external light is available, and presents a transmissive multi-color display making use of the light ray from the colored back light 18 when no external light is available. The liquid-crystal display device works as a reflective liquid crystal display with transflective functions. Although two states of voltage applied (ON) areas and non-voltage applied (OFF) areas are discussed, an intermediate tonal display is also possible.

(Modification of the third embodiment)

Referring to FIG. 6, a violet color polarizer 11 for violet may be used as the color polarizer 11 and a surface emitting type, light green EL device or a side light green LED device may be used for the back light 18. The optical element 16 may or may not be employed, and the light scattering body 10 may or may not be employed. When a light scattering layer or a light diffusion layer or a light-absorbing layer is used as the optical element 16, the external light reflected from the back light 18 with the back light 18 off and the back light emission with the back light 18 are attenuated. When the light scattering body 10 is used, the surface reflection from the polarizing splitter film 12 is softened to be of satin finish.

With the external light, the color with the segment off (voltage OFF, color of the background) is white while the color with the segment on (voltage ON) is violet.

With the back light emission, the color with the segment off (background color) is black while the color with the segment on (namely, the color of the seven-segment) is light green (EL) or green (LED).

In such a modification, part of the external light reflected from the side of the back light 18 facing the polarizing splitter film 12 (an emission surface in the EL or an emission surface of a light guide plate of the LED) may be used.

When there is a reflection from the back light 18, the use of the external light rather than the back light is contemplated.

In the voltage off (background), a white light having its polarization axis parallel to the page is incident on (and transmitted through) the violet color polarizer 11, is reflected from the polarizing splitter film 12, and exits from the violet color polarizer 11 as a white light in parallel to the page. A violet light ray having its polarization axis perpendicular to the page is transmitted through the violet color polarizer 11, is transmitted through the polarizing splitter film 12 from above, is partly reflected from the back light 18, is transmitted through the polarizing splitter film 12 from below, and exits from the violet color polarizer 11 as a violet light perpendicular to the page. Since the violet light perpendicular to the page is not totally reflected but partly reflected from the back light 18 and is transmitted through the polarizing splitter film 12 twice, its output light is weaker than its input light. The color with the voltage off is light violet with a white color tinged with a light violent. To lighten the violet color even further, the optical element 16 for scattering or absorbing light is provided such that the light reflected from the back light 18 is attenuated.

In the voltage on area (segment), a violet light having its polarization axis perpendicular to the page is reflected from the polarizing splitter film 12, and exists from the violet color polarizer 11 as a violet light perpendicular to the page. A white light having its polarization axis parallel to the page is transmitted through the polarizing splitter film 12, is partly reflected from the back light 18, is transmitted through the polarizing splitter film 12 again, and exits from the violet color polarizer 11 as a white light parallel to the page. Since the white light parallel to the page is not totally reflected but partly reflected from the back light 18 and is transmitted through the polarizing splitter film 12 twice, its output light is weaker than its input light. The color with the voltage on is a violet color tinged with a light white, but the violet color is still dominant. To weaken the white color, the optical element 16 for scattering or absorbing light is provided such that the light reflected from the back light 18 is attenuated.

The light ray parallel to the page, transmitted through the violet color polarizer 11, does not include all wavelengths, and is white tinged with violet. Since the white output light polarized parallel to the page in the voltage off area is near violet, the voltage off area is presented generally in light violet. Since the white output light polarized perpendicular to the page in the voltage on area is near violet, the voltage on area (segment) is presented in nearly the color of the violet color polarizer, thus generally in deep violet.

Although the user thus sees violet characters against the light violet background, this setting is easy to see because the violet characters on the light violent background look more handsome than violet characters against the white background.

(Fourth embodiment)

Figure 7:
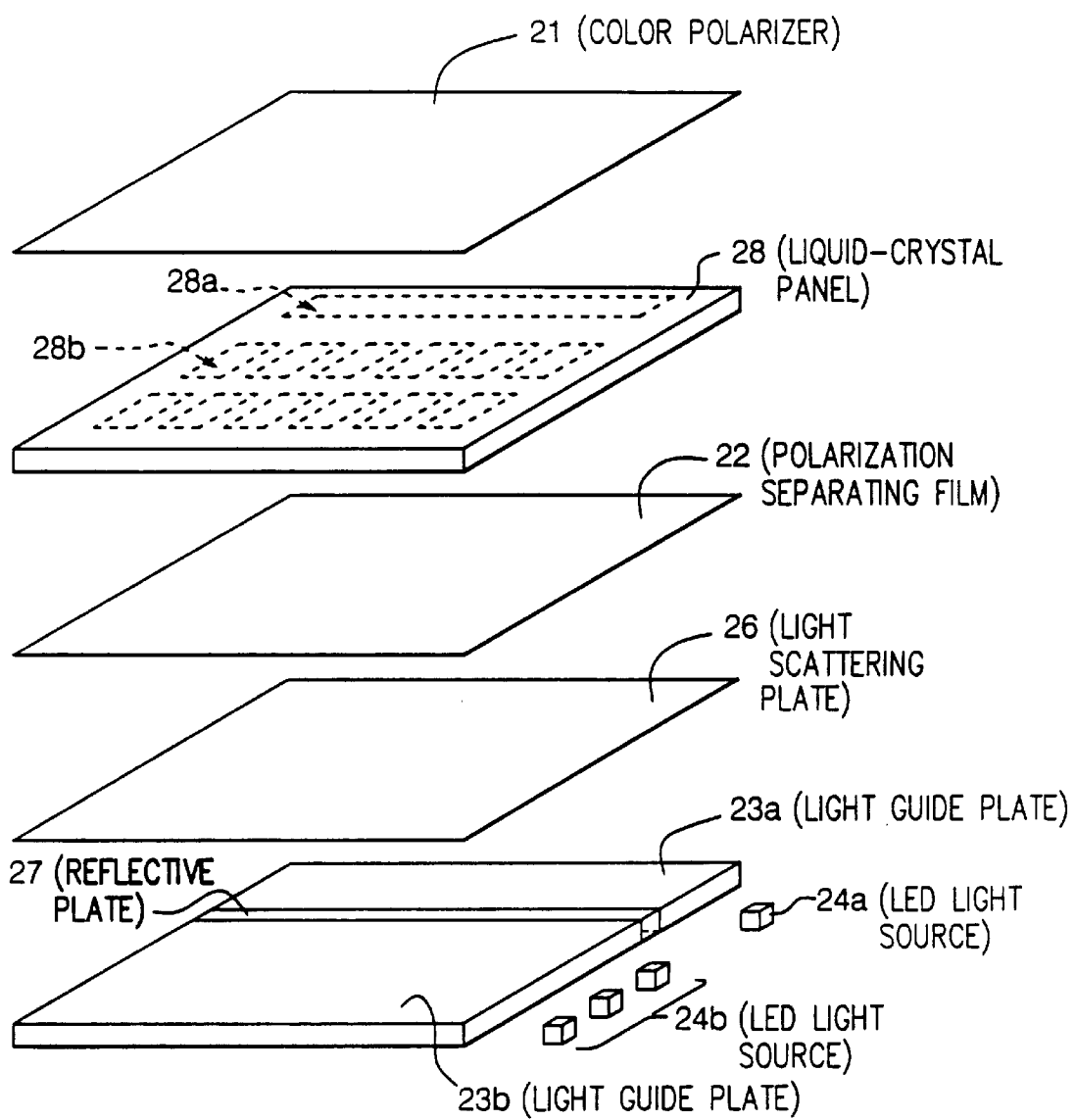
FIG. 7 is a perspective view diagrammatically showing yet another embodiment of the display device of the present invention.

FIG. 7 shows another embodiment of the liquid-crystal display device of the present invention. As the light emitting device in the above embodiments up to the third embodiment, the LED device arranged beside the light guide plate may be a single LED or a plurality of LEDs, of the same color, and a single light guide plate is employed. The EL device needs no surface-emitting type light guide plate. In a fourth embodiment, a plurality of different LEDs are employed for different effects.

A liquid-crystal panel 28 is arranged between a color polarizer 21 and a polarizing splitter film 22, and presents characters in areas designated by reference characters 28a and 28b. Light guide plates 23a and 23b are arranged corresponding to the character display areas 28a and 28b, and different LED light sources 24a and 24b are arranged for the light guide plates 23a and 23b, respectively. A reflector 27 is arranged between the light guide plates 23a and 23b to prevent the light rays from the respective light sources from mixing with each other. A light scattering plate 26 for scattering the back light exiting from the light guide plates is arranged between the polarizing splitter film 22 and the light guide plates 22a and 22b, or between the liquid-crystal panel 28 and the polarizing splitter film 22.

To guide light rays from the LED light sources 24a and 24b to the light guide plates 23a and 23b, respectively, the bottoms of the light guide plates may be tilted with the LED light sources 24a and 24b fixed there so that the light rays are reflected in parallel toward the color polarizer 21.

(Reflective display using the external light)

The reflective display with the external light incident on the liquid-crystal display device is now discussed. When the external light is incident in the non-voltage applied (OFF) area, the external light is decomposed into two linearly polarized light rays by the color polarizer 21 in the same way as shown in FIG. 3 or FIG. 6, and each is twisted in polarization direction by 90° by the liquid-crystal panel 28, and one of the two light rays is reflected from the polarizing splitter film 22, is twisted in polarization direction by 90° by the liquid-crystal panel 28 again, is transmitted through the color polarizer 21 and exits outwardly. This light ray is presented in white.

Since the incident external light is not absorbed but reflected by the polarizing splitter film 22 during the non-voltage (OFF) time, an extremely bright reflective display results. The light scattering plate 26 may be arranged between the polarizing splitter film 22 and the liquid-crystal panel 28, and with this arrangement, the light ray reflected from the polarizing splitter film 22 is changed from specular to white (satin finish). This arrangement softens the specular reflection, making the display easy to see.

When the external light is incident on the liquid-crystal display device in the voltage applied (ON) area, the external light is decomposed into two linearly polarized light rays by the color polarizer 21, and each light ray is transmitted through the liquid-crystal panel 28 without changing its polarization direction, and one of the two linearly polarized light rays is transmitted through the polarizing splitter film 22 without changing its polarization direction, and is scattered or depolarized by the light scattering plate 26, and most of the light ray is unable to return to the liquid-crystal panel 28. The other of the two linearly polarized light rays is reflected from the polarizing splitter film 22, is transmitted through the color polarizer 21, and exits outwardly. This light ray is presented in the color of the color polarizer 21.

(Transmissive display using the back light)

The transmissive display using the light ray from the back light, namely, the light guide plates 23a and 23b is now discussed. In the non-voltage applied (OFF) area, the light rays from the light guide plates 23a and 23b are incident on the polarizing splitter film 22 and becomes a linearly polarized light ray, which is twisted in polarization direction by 90° by the liquid-crystal panel 28, and is absorbed by the color polarizer 21 to be a black display.

On the other hand, in the voltage applied (ON) area, the light rays from the light guide plates 23a and 23b are incident on the polarizing splitter film 22 and becomes a linearly polarized light ray, which is then scattered by the light scattering plate 26, and the scattered light ray is transmitted through the liquid-crystal panel 28 without changing its polarization direction, is transmitted through the color polarizer 21, and is presented in a color corresponding to the coloration layers. Since the light guide plates 23a and 23b have different LED light sources 24a and 24b for the respective character display areas 28a, and 28b, the character display areas are presented in different colors.

The liquid-crystal display device works as a reflective liquid crystal display with transflective functions, in which the liquid-crystal display device presents a bright reflective display taking advantage of the reflection of the external light when the external light is available, and presents a transmissive display making use of the light ray from the light sources 24a and 24b when no external light is available. The use of light sources having different color lights permits a multi-color display.

(Fifth embodiment)

Figure 8:
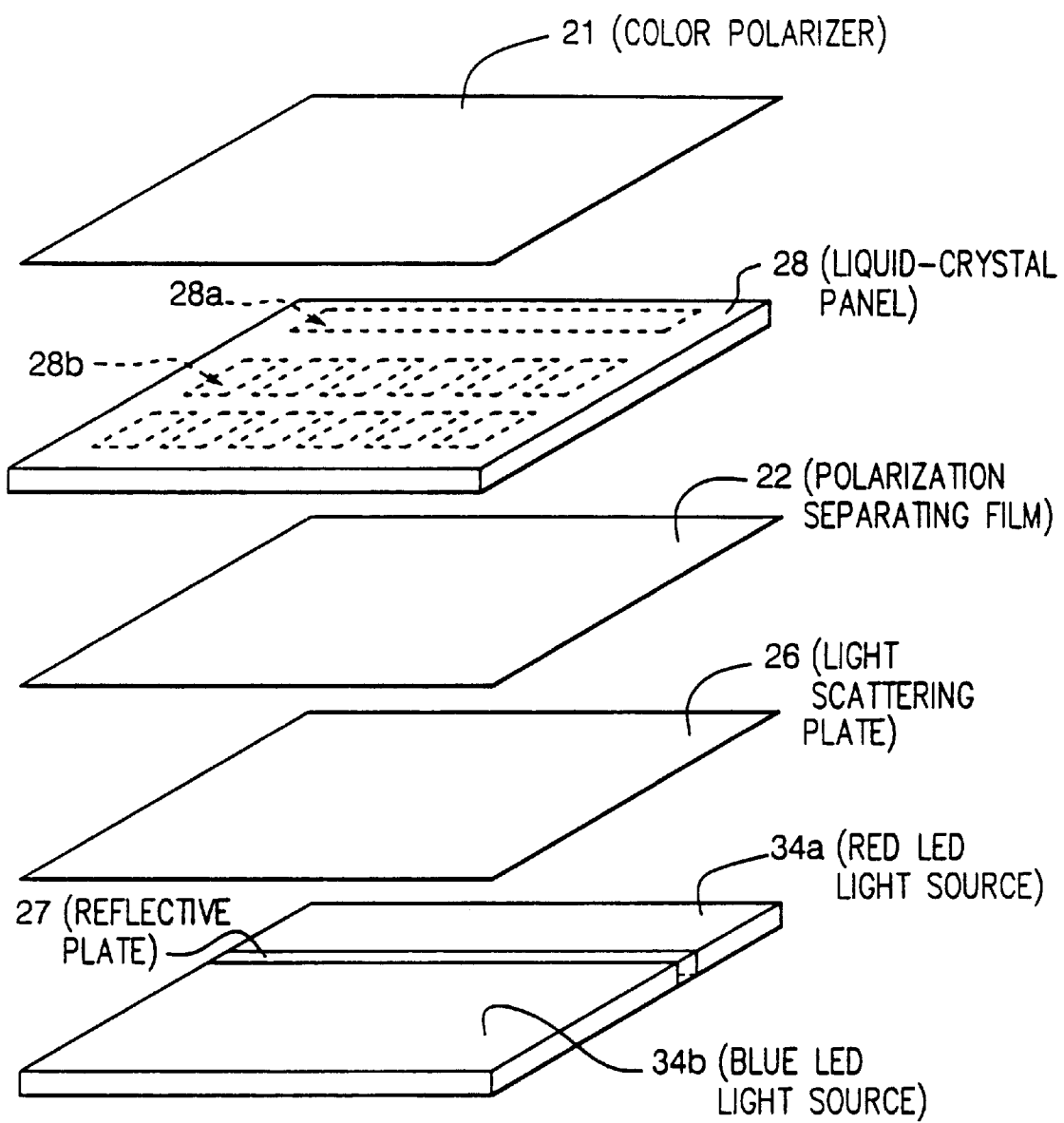
FIG. 8 is a perspective view diagrammatically showing yet another embodiment of the display device of the present invention.

FIG. 8 shows another embodiment of the liquid-crystal display device of the present invention. The fifth embodiment is different from the previous embodiment shown in FIG. 7 in that a plurality of LED light sources 34a and 34b as a direct backlight are substituted for the LED light sources having the different light guide plates 23a and 23b shown in FIG. 7. In this embodiment, again, a reflector 27 is arranged between the light sources 34a and 34b to prevent the light rays from the respective light sources from mixing with each other. In FIG. 8, components identical those described with reference to FIG. 7 are designated with the same reference characters, and the discussion about them is thus omitted.

The LED light source 34a includes a set of LED devices for emitting a red light, and the other LED light source 34b includes a set of LED devices emitting a blue light. The character display areas 28a and 28b are presented in mutually different colors during the transmissive displaying. More specifically, the character display area 28a is presented in red and the character display area 28b is presented in blue. During the reflective displaying, the same principle as described with reference to FIG. 7 applies. A blue EL device may be substituted for the blue LED device 34b.

(Sixth embodiment)

Figure 9:
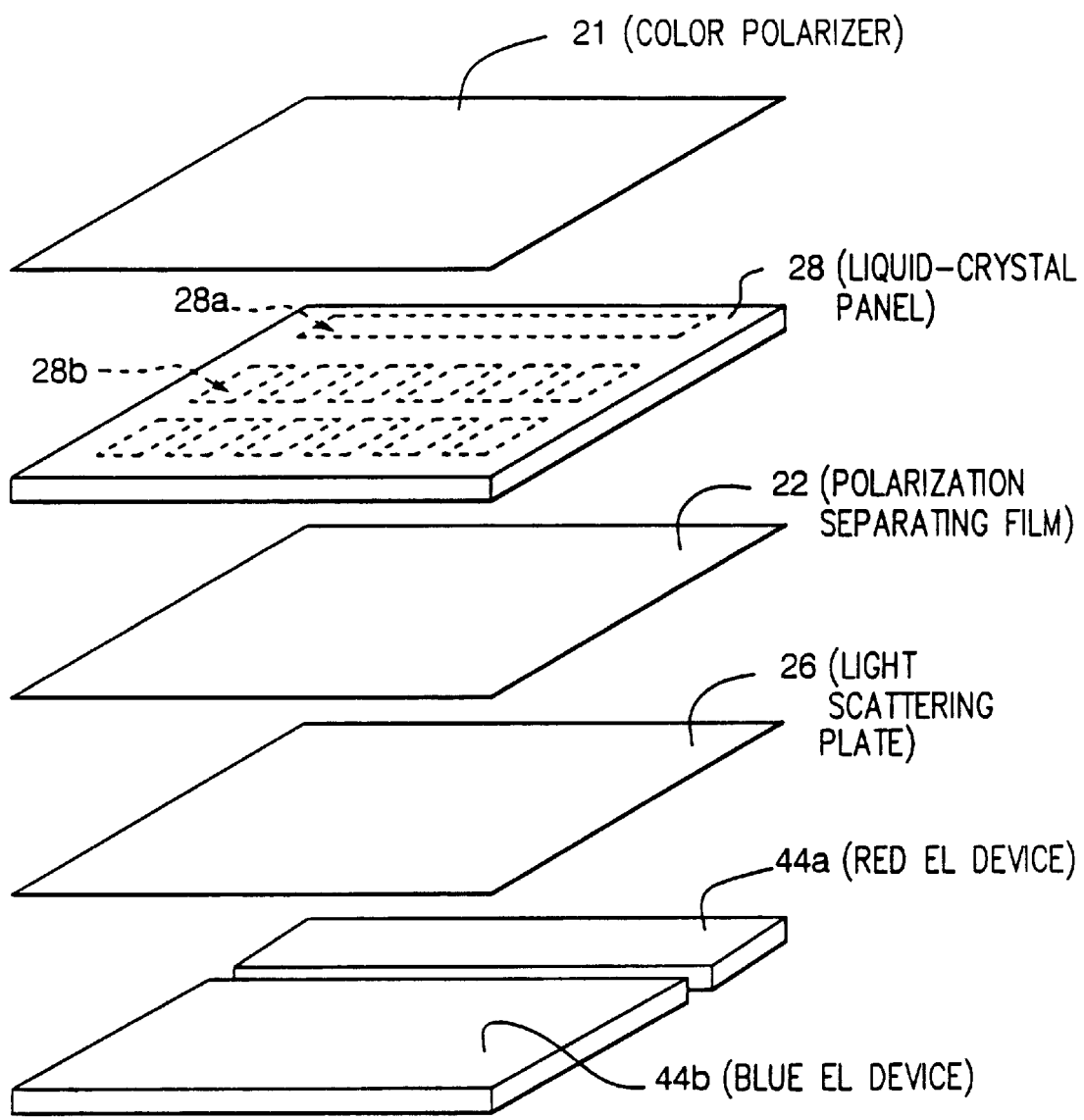
FIG. 9 is a perspective view diagrammatically showing yet another embodiment of the display device of the present invention.

FIG. 9 shows another embodiment of the liquid-crystal display device of the present invention. The sixth embodiment is different from the previous embodiment shown in FIG. 7 in that an EL device 44a emitting a red light and an EL device 44b emitting a green light as a direct backlight are substituted for the LED light sources having the different light guide plates 23a and 23b shown in FIG. 7. The EL devices 44a and 44b correspond, in position, to t he character display areas 28a and 38b. In FIG. 9, components identical those described with reference to FIG. 7 are designated with the same reference characters, and the discussion about them is thus omitted.

The character display areas 28a and 28b corresponding to the light sources 44a and 44b are presented in mutually different colors during the transmissive displaying. More specifically, the character display area 28a is presented in red and the character display area 28b is presented in blue. During the reflective displaying, the same principle as described with reference to FIG. 7 applies.

(Seventh embodiment)

Figure 10:
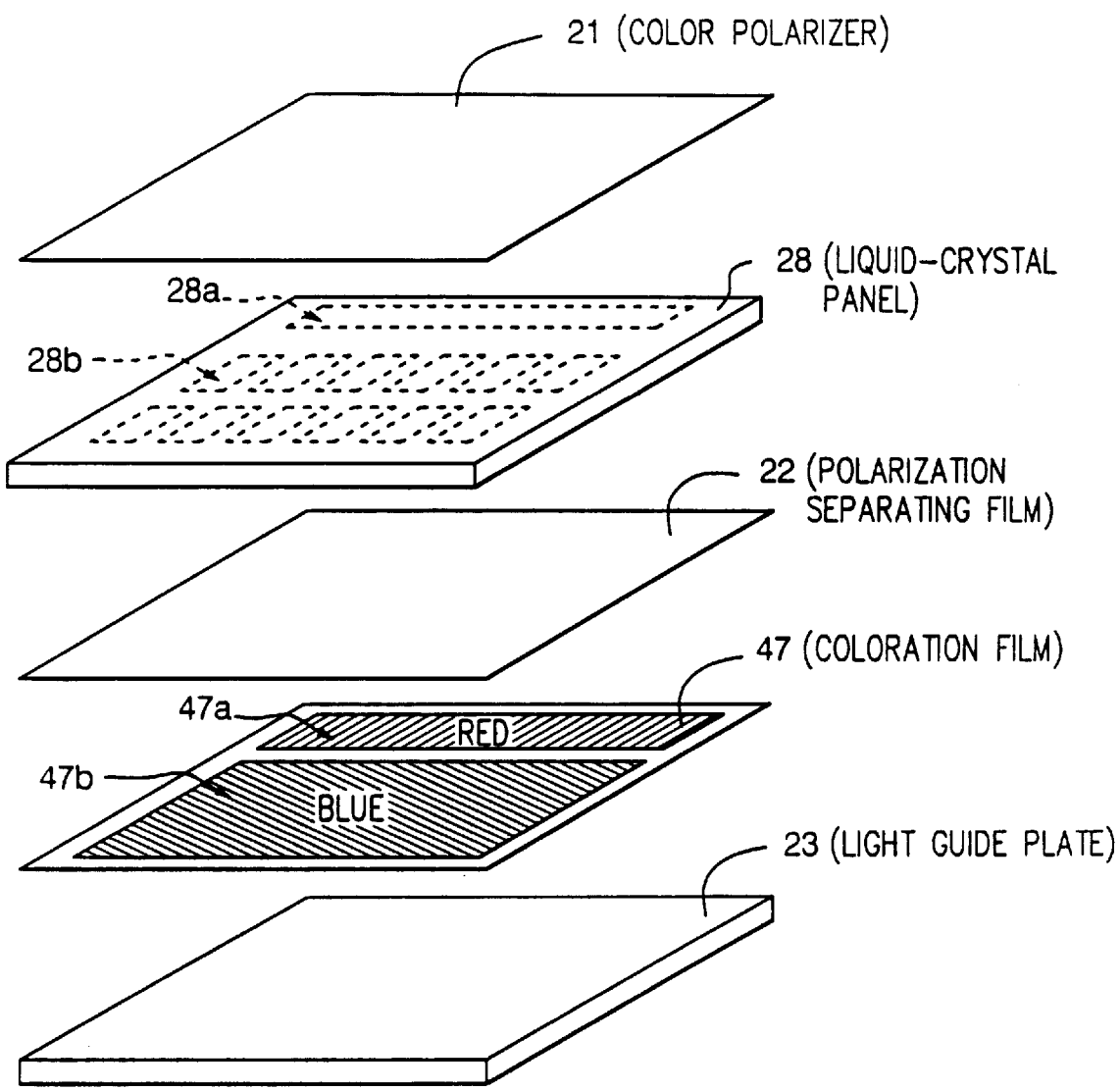
FIG. 10 is a perspective view diagrammatically showing yet another embodiment of the display device of the present invention.

FIG. 10 shows another embodiment of the liquid-crystal display device of the present invention. The light scattering plate 26 is arranged between the polarizing splitter film 22 and the light guide plates 23a and 23b in the embodiment shown in FIG. 7 while a coloration film 47 having a red coloration section 47a and a blue coloration section 47b is arranged between the polarizing splitter film 22 and a single light guide plate 23 in this embodiment. In FIG. 10, components identical those described with reference to FIG. 7 are designated with the same reference characters, and the discussion about them is thus omitted.

The character display areas 28a and 28b corresponding to the coloration sections 47a and 47b of the coloration film 47 are presented in mutually different colors during the transmissive displaying. More specifically, the character display area 28a is presented in red and the character display area 28b is presented in blue. During the reflective displaying, the same principle as described with reference to FIG. 7 applies.

(Eighth embodiment)

Figure 11:
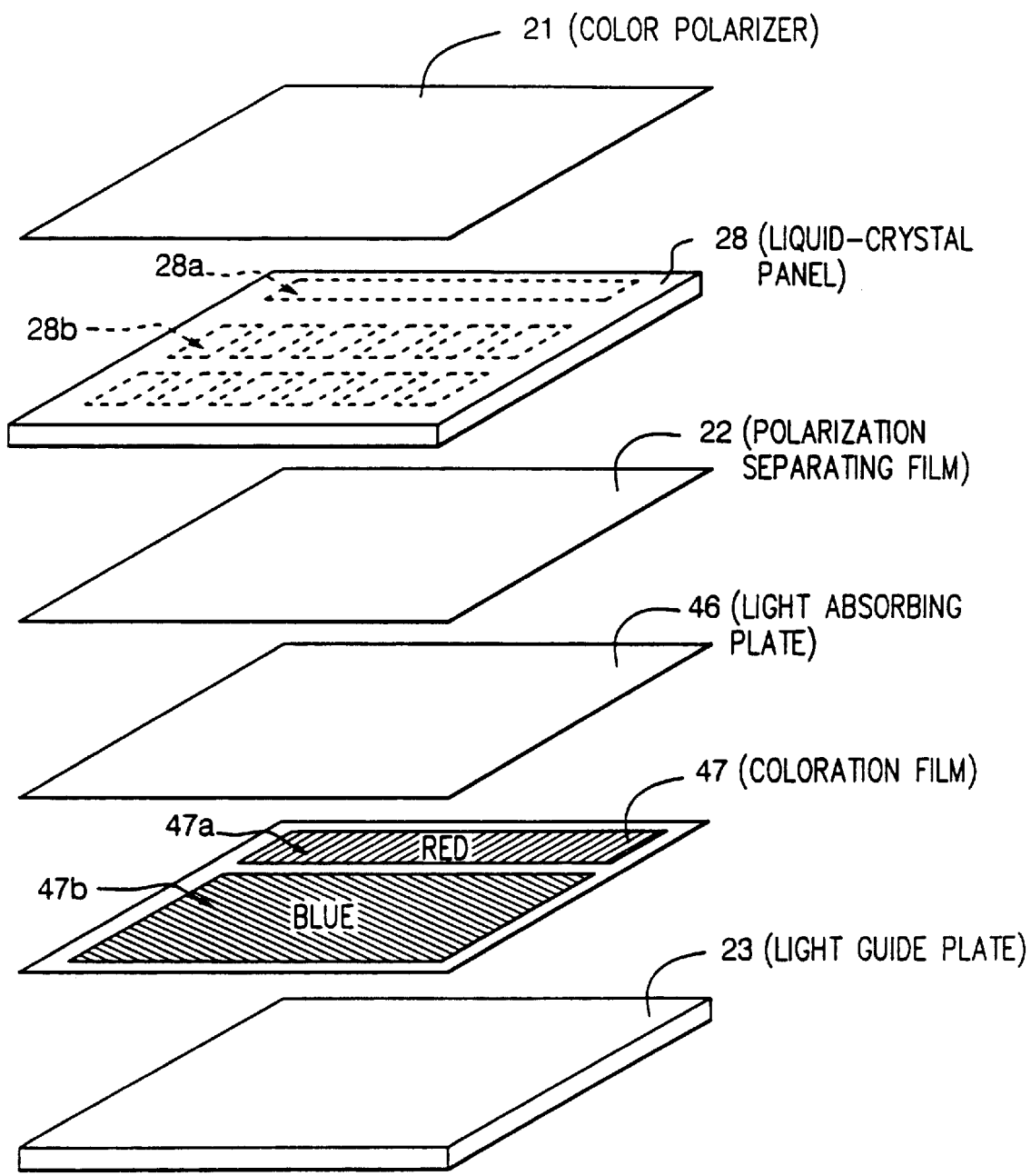
FIG. 11 is a perspective view diagrammatically showing yet another embodiment of the display device of the present invention.

FIG. 11 shows another embodiment of the liquid-crystal display device of the present invention. The coloration film 47 is arranged between the polarizing splitter film 22 and the light guide plate 23 in the embodiment shown in FIG. 10 while, besides that arrangement, a gray, semi-transmissive light-absorbing plate 46 is arranged between the polarizing splitter film 22 and the coloration film 47 in this embodiment. In FIG. 11, components identical those described with reference to FIG. 7 are designated with the same reference characters, and the discussion about them is thus omitted.

In this embodiment, the gray, semi-transmissive light absorbing plate 46 prevents the light ray, which is transmitted through the polarizing splitter film 22 during the reflective displaying, from being reflected from the light guide plate 23 and the coloration film 47. The light-absorbing plate 46 may be replaced with a light-absorbing body having an opening or a polarizer having its polarization axis shifted off the polarizing splitter film 22.

(Ninth embodiment)

Figure 12:
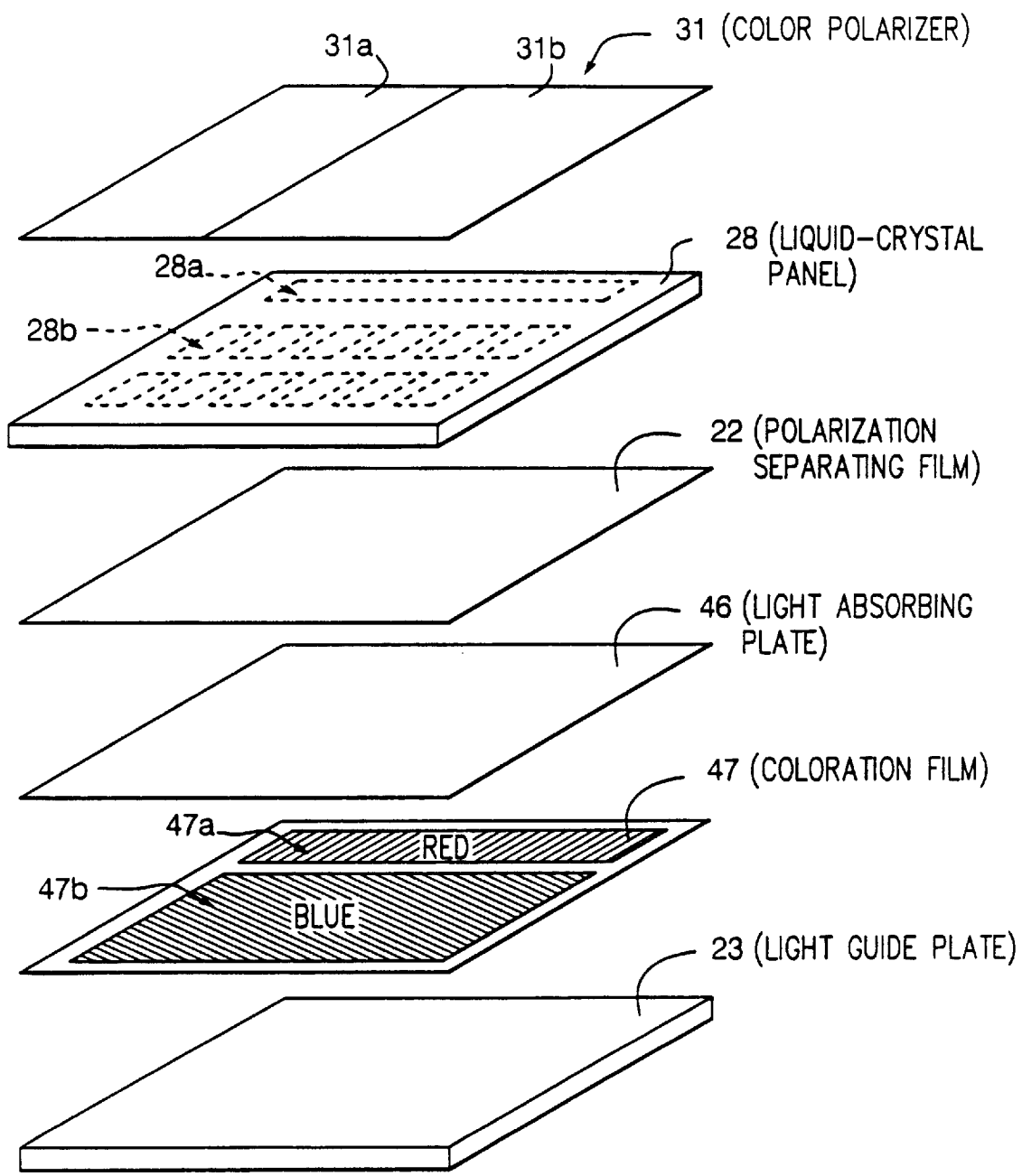
FIG. 12 is a perspective view diagrammatically showing yet another embodiment of the display device of the present invention.

FIG. 12 shows another embodiment of the liquid-crystal display device of the present invention. In this embodiment, a color polarizer 31 is split into two portions 31a and 31b. The rest of the construction of this embodiment remains unchanged from that shown in FIG. 11, and the discussion about it is omitted. In this embodiment, by splitting the color polarizer 31 into two, the character display areas 28a and 28b are differently colored correspondingly to the split portions.

(Tenth embodiment)

Figure 13:
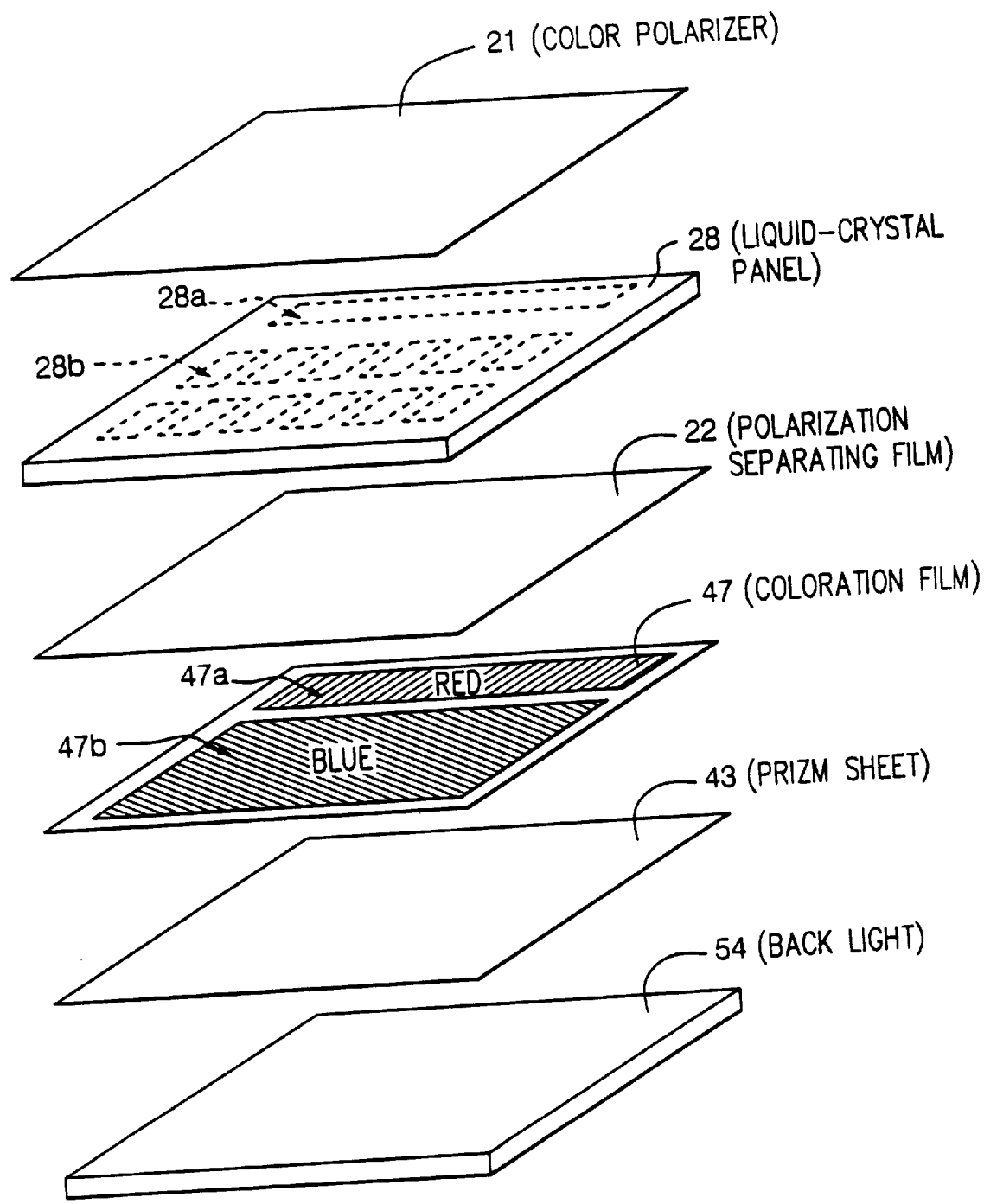
FIG. 13 is a perspective view diagrammatically showing yet another embodiment of the display device of the present invention.

FIG. 13 shows another embodiment of the liquid-crystal display device of the present invention. In this embodiment, a prism sheet 43 is arranged between a back light 54 and a coloration film 47. In FIG. 13, components identical those described with reference to FIG. 7 are designated with the same reference characters, and the discussion about them is thus omitted. In this embodiment, the use of the prism sheet 43 condenses the light ray from the back light 54 toward the front of the liquid-crystal display device, and for this reason, the brightness of the transmissive display is even more increased. Available as the prism sheet 43 is DEF-90 (trade name) manufactured by 3M.

(Eleventh embodiment)

Figure 14:
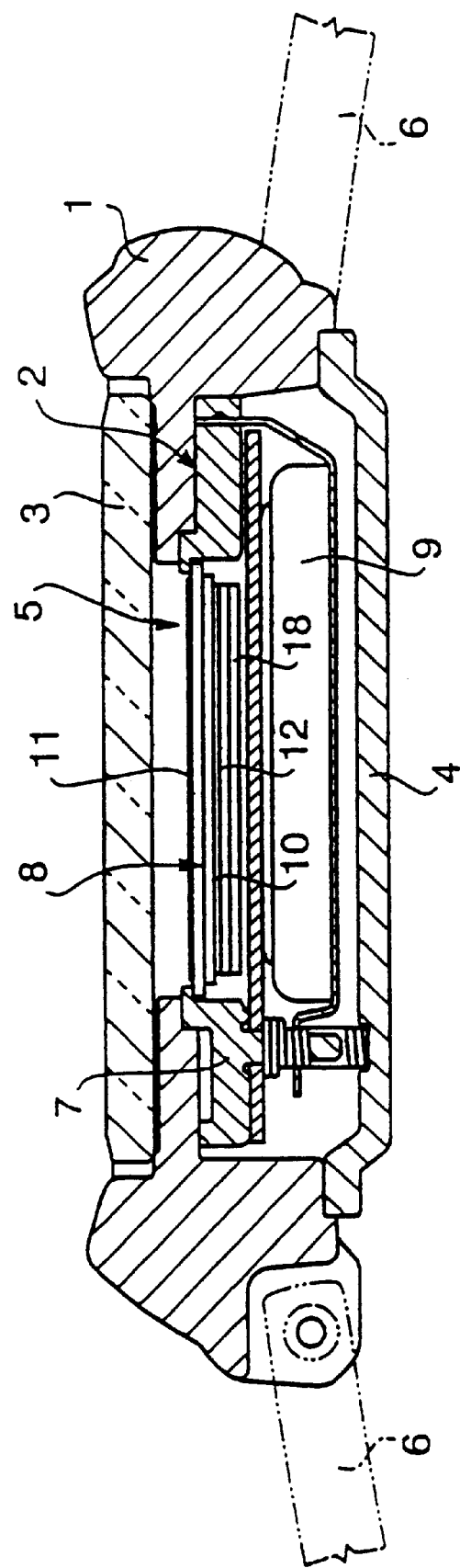
FIG. 14 is a cross-sectional view showing one embodiment of an electronic watch of the present invention.

FIG. 14 is a cross-sectional view showing one embodiment of the electronic watch of the present invention. This wristwatch comprises, for example, a plastic casing 1, an assembly 2 housed in the inside of the casing 1, a glass cover 3 arranged above the assembly 2 and secured to the casing 1, and a bottom cover 4 for supporting the assembly 2. Designated reference numeral 6 is a wrist strap.

Figure 16:
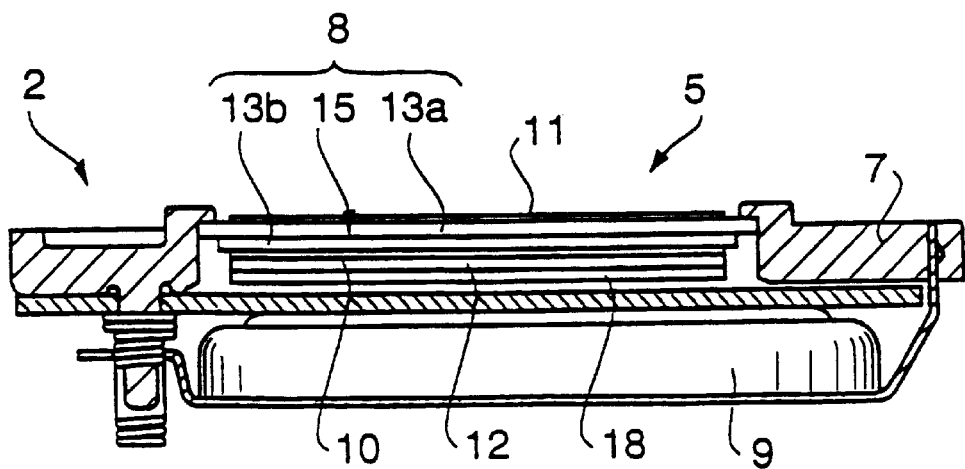
FIG. 16 is a cross-sectional view showing the construction of the electronic watch shown in FIG. 15.

Referring to FIG. 16, the assembly 2 comprises a panel frame 7, a display device 5 supported by the panel frame 7, and a battery 9 arranged beneath the display device 5. The construction of the display device 5 is something like the one shown in FIG. 3, and the display device 5 comprises a liquid crystal panel 8 as polarization axis varying means supported by the panel frame 7, a color polarizer 11 as first polarizing splitter means glued onto the external surface (top surface in FIG. 16) of the liquid crystal panel 8, a polarizing splitter film 12 as second polarizing splitter means opposed to the polarizer 11 with the liquid crystal panel 8 therebetween, a back light 18 arranged on the underside of the polarizing splitter film 12. A light scattering body 10 is arranged between the polarizing splitter film 12 and the liquid crystal panel 8.

Figure 15:
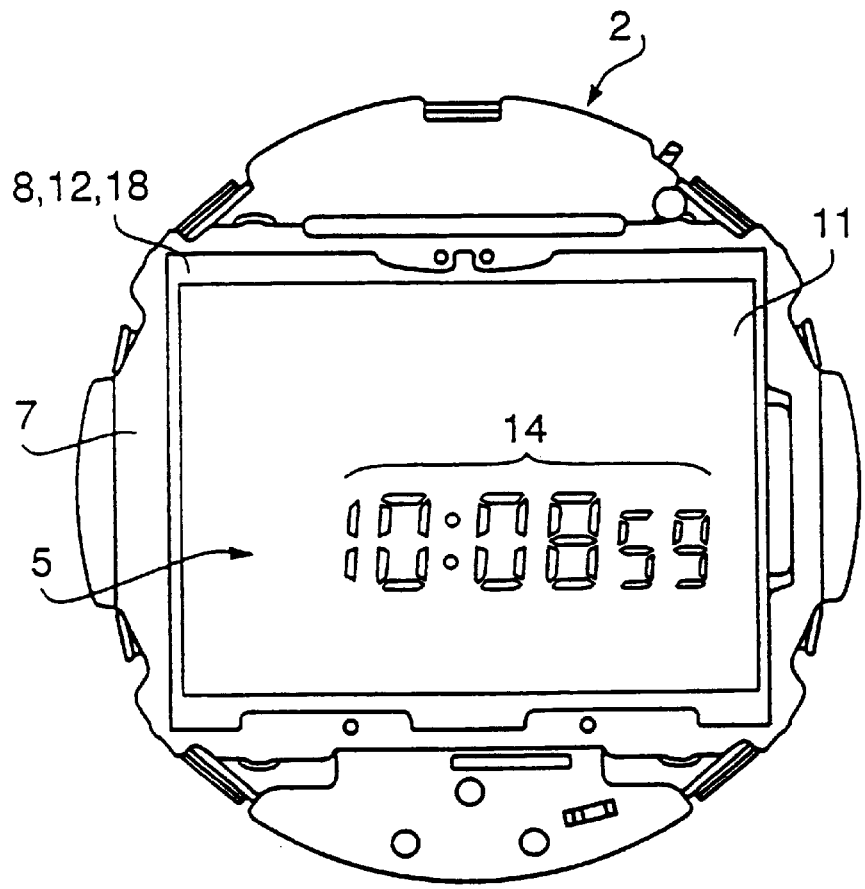
FIG. 15 a plan view showing a major portion of the electronic watch of FIG. 14.

The liquid crystal panel 8 comprises a pair of opposing light transmissive transparent glass substrates 13a and 13b, and a gap formed between the two glass substrates, namely a cell gap, is filled with a liquid crystal, for example, a TN liquid 15. The glass substrates 13a and 13b are provided with a plurality of light transmissive electrodes 14 to present numeric information and the like as shown in FIG. 15. In this embodiment, seven-segment light transmissive electrodes 14 are used to present one digit of numbers.

The mutually opposing light transmissive electrodes 14, formed on each of the pair of glass substrates 13a and 13b, are supplied with a predetermined voltage, and whether the voltage is applied (ON) or not applied (OFF) sets which of the two states the liquid crystal 15 takes in its alignment. The liquid crystal of this embodiment does not vary the polarization axis of the linearly polarized light ray during its ON state, while it twists the polarization axis of the linearly polarized light ray by 90° during its OFF state.

The manner in which numeric information and the like are presented on the display device 5 is already described with reference to FIG. 3 and is not discussed again, and time information in number and character is presented in the transmissive and reflective multi-color displays in an extremely bright state.

The following table summarizes the relationship of the transmission axis of the color polarizer and the transmission axis of the polarizing splitter film and the color of the color polarizer seen from the outside.

|  | Direction of polarization axis | Color with segment off (background) | Color with segment on |
|---|---|---|---|
| External light | Polarization axis of wavelength specific to color polarizer is parallel to polarization axis of polarizing splitter film | Wavelength specific to color polarizer | White |
|  | Polarization axis of wavelength specific to color polarizer is perpendicular to polarization axis of polarizing splitter film | White | Wavelength specific to color polarizer |

-continued

| | Direction of polarization axis | Color with segment off (background) | Color with segment on |
|---|---|---|---|
| Back light | Polarization axis of wavelength specific to color polarizer is parallel to polarization axis of polarizing splitter film | Emission color of back light | Black |
| | Polarization axis of wavelength specific to color polarizer is perpendicular to polarization axis of polarizing splitter film | Black | Emission color of back light |

INDUSTRIAL APPLICABILITY

The display device of the present invention is easily and reliably manufactured of a liquid crystal, and is preferably used in an electronic watch, a portable telephone, and an image display unit for a diversity of electronic apparatuses. The electronic watch of the present invention serves the purpose of presenting time information in color in the form of numbers, characters and graphics.

What is claimed is:

1. A display device comprising:
   a polarization axis changing element that selectively changes a polarization axis of light transmitted therethrough;
   a first polarization separator and a second polarization separator respectively arranged on front and rear sides of said polarization changing element with said polarization changing element interposed therebetween; and
   a light source arranged on a side of said second polarization separator opposed to said polarization axis changing element with said second polarization separator interposed therebetween;
   said first polarization separator transmitting all wavelengths, in the visible light region, of light linearly polarized in a first direction, and transmitting a specific wavelength, in the visible light region, of light linearly polarized in a second direction perpendicular to said first direction, and not transmitting other wavelengths of light linearly polarized in the second direction therethrough;
   said second polarization separator transmitting light linearly polarized in a third direction while reflecting light linearly polarized in a direction perpendicular to said third direction; and
   said light source emits colored light.

2. The display device according to claim 1 further comprising at least one optical element between said polarization axis changing element and said light source.

3. The display device according to claim 2, said optical element having a light scattering body or a gray, semi-transmissive, light-absorbing body.

4. The display device according to claim 3, said optical element has having a transmittance within a range from 10% to 80% in substantially all wavelengths of light in the visible light region.

5. The display device according to claim 2, said optical element arranged between said polarization axis changing element and said second polarization separator, the optical element softening external light reflected from said second polarization separator.

6. The display device according to claim 2, said optical element arranged between said second polarization separator and said light source, the optical element absorbing the light from said second polarization separator and transmitting the light from said light source toward said second polarization separator and attenuating external light reflected from the light source.

7. The display device according to claim 1, said light source comprising at least one LED device or at least one EL (Electroluminescence) device.

8. The display device according to claim 2, said optical element comprising a coloration layer.

9. The display device according to claim 2, said optical element being a gray, semi-transmissive, light absorbing and scattering body.

10. The display device according to claim 2, said optical element comprising a coloration layer and a specular reflector having an opening, arranged on a side of said second polarization separator.

11. A display device comprising:
    a color polarizer that transmits a specific wavelength of light polarized in parallel with a first polarization axis while transmitting substantially all wavelengths, in the visible light region, of light polarized in a direction perpendicular to said first polarization axis;
    a liquid crystal which rotates the polarization axis of an incident light by 90° in a non-voltage applied state while not rotating the polarization axis of the incident light in a voltage applied state;
    a polarization separator that transmits light polarized in parallel with said first polarization axis while reflecting light polarized perpendicular to said first polarization axis; and
    a light emitting element that emits light having a wavelength different from said specific wavelength.

12. A display device comprising:
    a color polarizer that transmits a specific wavelength of light polarized in perpendicular to a first polarization axis while transmitting substantially all wavelengths, in the visible light region, of light polarized in a direction parallel to said first polarization axis;
    a liquid crystal layer which rotates the polarization axis of incident light by 90° in a non-voltage applied state while not rotating the polarization axis of the incident light in a voltage applied state;
    a polarization separator that transmits light polarized in parallel with said first polarization axis while reflecting light polarized perpendicular to said first polarization axis; and
    a light emitting element that emits light having a wavelength different from said specific wavelength.

13. The display device according to claim 11, said light emitting element having a reflective surface that reflects external light.

14. The display device according to claim 12, said light emitting element having a reflective surface that reflects external light.

15. The display device according to claim 11, further comprising a light scattering body disposed between said liquid crystal layer and said light emitting element.

16. A display device according to claim 12, further comprising a light scattering body between said liquid crystal layer and said light emitting element.

17. The display device according to claim 13, wherein when the emission of said light emitting element is disabled, a light color in the non-voltage applied state is a color corresponding to the specific wavelength and a light color in the voltage applied state is a color of substantially all wavelengths; and when the emission of said light emitting element is enabled, the light color in the non-voltage applied state is an emission color of said light emitting element and the light color in the voltage applied state is black.

18. The display device according to claim 14, wherein when the emission of said light emitting element is disabled, a light color in the non-voltage applied state is a color corresponding to substantially all wavelengths and a light color in the voltage applied state is a color of the specific wavelength; and when the emission of said light emitting element is enabled, the light color in the non-voltage applied state is black and the light color in the voltage applied state is a emission color of said light emitting element.

19. The display device according to claim 18, wherein the specific wavelength of said color polarizer corresponds to a violet or near violet color;

an emission color of said light emitting element is green or greenish;

a light color derived from the external light in said non-voltage applied state is light violet; and a light color derived from the external light in said voltage applied state is deep violet.

20. An electronic watch for counting and displaying time, comprising:

a polarization axis changing element that selectively changes a polarization axis of light transmitted therethrough;

a first polarization separator and a second polarization separator respectively arranged on front and rear sides of said polarization axis changing element with said polarization axis changing element interposed therebetween; and a light source arranged on a side of said second polarization separator opposed to said polarization axis changing element with said second polarization separator interposed therebetween;

said first polarization separator transmitting all wavelengths, in the visible light region, of light linearly polarized in a first direction, and transmitting a specific wavelength, in the visible light region, of light linearly polarized in a second direction perpendicular to said first direction with the remaining wavelengths of light linearly polarized in the second direction not transmitted therethrough;

said second polarization separator transmitting light linearly polarized in a third direction while reflecting light linearly polarized in a direction perpendicular to said third direction; and said light source emits colored light.

21. An electronic watch comprising:

a color polarizer which transmits a specific wavelength of a light polarized in parallel with a first polarization direction while transmitting substantially all wavelengths, in the visible light region, of light polarized in a direction perpendicular to said first polarization direction;

a liquid crystal which rotates the polarization axis of incident light by 90° in a non-voltage applied state while not rotating the polarization axis of the incident light in a voltage applied state;

a polarization separator that transmits light polarized in a second polarization direction while reflecting light polarized in a direction perpendicular to said second polarization direction; and a light emitting element that emits light of a color different from said specific wavelength, wherein when said first polarization direction is parallel to said second polarization direction, a light color derived from external light in a non-voltage applied state is a color corresponding to said specific wavelength and a light color derived from the external light in a voltage applied state is a color corresponding to substantially all wavelengths in the visible light region;

when said first polarization direction is parallel to said second polarization direction, a light color of said light emitting element in the non-voltage applied state is an emission color, and the light color of said light emitting element in the voltage applied state is black;

when said first polarization direction is perpendicular to said second polarization direction, the light color derived from the external light in the non-voltage applied state is the color corresponding to substantially all wavelengths in the visible light region and the light color derived from the external light in the voltage applied state is the color corresponding to said specific wavelength; and when said first polarization direction is perpendicular to said second polarization direction, the light color of said light emitting element in the non-voltage applied state is black and the light color of said light emitting element in the voltage applied state is the emission color.

22. The electronic timepiece for counting and displaying time, comprising:

a polarization axis changing element that selectively changes a polarization axis of light transmitted therethrough;

a first polarization separator and a second polarization separator respectively arranged on front and rear sides of said polarization axis changing element with said polarization axis changing element interposed therebetween; and a light source arranged on a side of said polarization separator opposed to said polarization axis changing element with said second polarization separator interposed therebetween;

said first polarization separator transmitting all wavelengths, in the visible light region, of light linearly polarized in a first direction, and transmitting a specific wavelength, in the visible light region, of light linearly polarized in a second direction perpendicular to said first direction with the remaining wavelengths of light linearly polarized in the second direction not transmitted therethrough;

said second polarization separator transmitting light linearly polarized in a third direction while reflecting light linearly polarized in a direction perpendicular to said third direction; and said light source emits colored light.

23. An electronic timepiece comprising:

a color polarized which transmits a specific wavelength of a light polarized in parallel with a first polarization direction while transmitting substantially all wavelengths, in the visible light region, of light polarized in a direction perpendicular to said first polarization direction;

a liquid crystal which rotates the polarization axis of incident light by 90° in a non-voltage applied state while not rotating the polarization axis of the incident light in a voltage applied state;

a polarization separator that transmits light polarized in a second polarization direction while reflecting light polarized in a direction perpendicular to said second polarization direction; and a light emitting element that emits light of a color different from said specific wavelength, wherein when said first polarization direction is parallel to said second polarization direction, a light color derived from external light in a non-voltage applied state is a color corresponding to said specific wavelength and a light color derived from the external light in a voltage applied state is a color corresponding to substantially all wavelengths in the visible light region;

when said first polarization direction is parallel to said second polarization direction, a light color of said light emitting element in the non-voltage applied state is an emission color, and the light color of said light emitting element in the voltage applied state is black;

when said first polarization direction is perpendicular to said second polarization direction, the light color derived from the external light in the non-voltage applied state is the color corresponding to substantially all wavelengths in the visible light region and the light color derived from the external light in the voltage applied state is the color corresponding to specific wavelength; and when said first polarization direction is perpendicular to said second polarization direction, the light color of said light emitting element in the non-voltage applied state is black and the light color of said light emitting element in the voltage applied state is the emission color.

24. The electronic timepiece according to claim 23 including said color polarizer, said liquid crystal layer and said polarization separating means laminated in this order, further comprising:

a light scattering element arranged between said liquid crystal layer and said polarization separator; and a lightly reflective element arranged beneath said polarization separator, said light emitting element being an electroluminescence device and said lightly reflective element being an emitting surface of said electroluminescence device.

25. The electronic timepiece of claim 24, said light emitting element being an LED device and said lightly reflective element being an emitting surface of a light guide plate.

* * * * *